United States Patent
Rolindez Alberich et al.

(10) Patent No.: US 9,961,725 B2
(45) Date of Patent: May 1, 2018

(54) LED DRIVER FOR HIGH-SPEED OPTICAL COMMUNICATIONS BASED ON LINEAR MODULATIONS

(71) Applicant: Knowledge Development for POF SL, Madrid (ES)

(72) Inventors: Luis Rolindez Alberich, Madrid (ES); Alberto Rodriguez-Perez, Madrid (ES); Ruben Perez de Aranda Alonso, Madrid (ES)

(73) Assignee: Knowledge Development For POF SL, Madrid (ES)

( * ) Notice: Subject to any disclaimer, the term of this patent is extended or adjusted under 35 U.S.C. 154(b) by 0 days. days.

(21) Appl. No.: 15/660,127

(22) Filed: Jul. 26, 2017

(65) Prior Publication Data

US 2018/0035498 A1 Feb. 1, 2018

(30) Foreign Application Priority Data

Aug. 1, 2016 (EP) .................................. 16382380

(51) Int. Cl.
*H05B 33/08* (2006.01)
*H04B 10/50* (2013.01)

(52) U.S. Cl.
CPC ......... *H05B 33/0812* (2013.01); *H04B 10/50* (2013.01)

(58) Field of Classification Search
CPC ............ H05B 33/0815; H05B 33/0812; H05B 33/0809; H05B 33/0887; H05B 33/0845; H05B 33/0839; H04B 10/1127; H04B 10/502; H04B 10/508; H04B 10/50; H04B 10/80; Y02B 20/347; A61B 5/0017
See application file for complete search history.

(56) References Cited

U.S. PATENT DOCUMENTS

| | | | | |
|---|---|---|---|---|
| 4,330,870 A | * | 5/1982 | Arends | H04B 10/1127 398/129 |
| 6,724,376 B2 | * | 4/2004 | Sakura | H04B 10/502 327/109 |
| 7,215,891 B1 | * | 5/2007 | Chiang | H04B 10/40 398/137 |
| 9,094,151 B2 | * | 7/2015 | Perez De Aranda Alonso | H04J 14/08 |
| 9,491,818 B2 | * | 11/2016 | Fan | H05B 33/0815 |
| 2014/0021879 A1 | | 1/2014 | Yu et al. | |
| 2014/0361705 A1 | | 12/2014 | Nederbragt et al. | |

OTHER PUBLICATIONS

European Search Report dated Feb. 1, 2017 for European Patent Application No. EP16382380.0.

* cited by examiner

*Primary Examiner* — Haissa Philogene
(74) *Attorney, Agent, or Firm* — Plumsea Law Group, LLC

(57) ABSTRACT

This invention relates to a light emitting diode driving circuit (101) for use in an optical transmitter (100) comprising: a high-speed signal path (102) comprising a high-speed trans-conductance amplifier (114) configured for a linear transformation of an input signal to an output signal for linear modulation of a light emitting diode (110), and a low-frequency control path (103) configured for generating a trans-conductance (115) in dependence of a low-frequency component of the input signal (106), and wherein the low-frequency control path (103) is configured for controlling the trans-conductance (116) of the high-speed trans-conductance amplifier (114).

14 Claims, 14 Drawing Sheets

LED DRIVER FOR HIGH-SPEED OPTICAL COMMUNICATIONS BASED ON LINEAR MODULATIONS

BACKGROUND

The invention relates to a light emitting diode driving circuit for use in an optical transmitter and an optical transmitter for use in an optical communication system.

Optical communication systems are nowadays widely used in home networks and industrial applications, for example, the MOST (Media Oriented Systems Transport) technology used in the automotive industry for high-speed multimedia networks is based on plastic over fiber (POF) technology.

In said optical communication systems, as for example described in US 2013/0330082 A1, a light emitting device, the optical transmitter, outputs an optical signal that is fed into an optical fiber link, e.g. a plastic fiber, which guides the optical signal to a light receiving device, the optical receiver.

Such optical communication systems inter alia have several advantages compared with the conventional non-optical communication systems over copper: e.g. lower attenuation, immunity to electromagnetic interference irradiation and higher data rate transmission. In recent years optical communication systems are therefore more and more also used for in-vehicle data communication.

Current optical communication systems however are inter alia suffering from the challenge that, the performance of the optical communication system, in particular the performance of the optical transmitter, can degrade due to undesired fluctuations or changes in supplied voltage, temperature and/or due to local process variations (also called process variations for brevity), i.e. due to naturally occurring variations in the attributes of electronic components such as transistors when electronic integrated circuits are manufactured.

SUMMARY

It is therefore the object of the present invention to provide means for improving an optical communication system. For example, the object may comprise improving the performance and reliability of an optical communication system.

According to the present invention, this object is achieved by an electronic circuit and an optical transmitter. Advantageous embodiments and further developments are the subject matter of the subclaims.

For example, a light emitting diode driving circuit or light emitting diode driver according to the present invention for use in an optical transmitter can comprise:

a high-speed signal path comprising a high-speed trans-conductance amplifier configured for a linear transformation of an input signal, e.g. an input voltage signal, to an output signal, e.g. an output current signal, for linear modulation of a light emitting diode, and a low-frequency control path configured for generating a trans-conductance in dependence of a low-frequency component of the input signal.

Furthermore, the low-frequency control path can be configured for controlling the trans-conductance of the high-speed trans-conductance amplifier based on the trans-conductance generated by the low-frequency control path.

A possible transformation of an input signal to an output signal for linear modulation of a light emitting diode can thereby comprise a modulation of the light emitting diode based on the so-called pulse-amplitude-modulation (PAM) technique. In contrast to a conventional binary on-off keying modulation, in the pulse-amplitude-modulation (PAM) technique a plurality of distinct pulse amplitude levels mapped to plurality of bits can be used to convey information. For example, each amplitude level represents a plurality of bits, e.g. a pair of bits, such that a single amplitude level can transmit more than one bit, thereby increasing the bandwidth efficiency.

Therein the input signal can be a differential input signal, for example a differential voltage input signal ($V_{DIFF,IN}$) defined by the difference of two voltage inputs, for example by a voltage at an inverting input, $V_{IN}$, and a voltage at a non-inverting input, $V_{IP}$, i.e. by $V_{DIFF,IN}=V_{IP}-V_{IN}$ Herein, the term low-frequency can, for example, refer to frequencies lower than 5 kHz, and the term high-speed or high-frequency can, for example, refer to frequencies higher than 100 MHz.

The high-speed trans-conductance ($G_M$) amplifier can, for example, convert the voltage input signal, e.g. a differential voltage input signal, into a current flowing through the light emitting diode (LED). Said light emitting diode can further be connected to a power supply, e.g. via a VDD pin.

A light emitting diode driving circuit according to the present invention allows the realisation of high-speed and high-bandwidth optical communications based on linear modulations in optical communication systems linked with optical fibers, for example, linked with plastic optical fibers.

Furthermore, a light emitting diode driving circuit according to the present invention allows compensating for process/voltage/temperature (PVT) variations and input signal amplitude variations in the optical communication system.

The high-speed signal path can further comprise a high-speed differential input signal conditioner for optionally applying a gain ($G_{HS}$) to a/the differential input signal, thereby generating $V_{DIFF}=G_{HS}\cdot(V_{IP}-V_{IN})=G_{HS}\cdot V_{DIFF,IN}$ In addition the high-speed differential input signal conditioner can also adapt the common-mode of the input signal.

The modulated current ($I_{MODULATED}$), i.e. for example the output signal for a linear modulation of the light emitting diode, flowing through the LED can be proportional to the amplifier trans-conductance ($G_M$) and can be proportional to $V_{DIFF,IN}$ or, in case of the application of a high-speed differential input signal conditioner, can be proportional to $V_{DIFF}$. For example, the linearly modulated current ($I_{MODULATED}$) can be defined as: $I_{MODULATED}=G_M\cdot V_{DIFF}$ Furthermore, a bias current ($I_{BIAS}$) can in addition flow through the LED, so that the total current ($I_{LED}$) flowing through the LED can be defined as: $I_{LED}=I_{MODULATED}+I_{BIAS}$ Said bias current ($I_{BIAS}$), for example, can be defined as: $I_{BIAS}=I_{MAX}+I_{MIN}/2$, wherein, for example $$I_{MAX}=I_{MODULATED,MAX}+I_{BIAS}=G_M\cdot V_{DIFF,MAX}+$$
$$I_{BIAS}=G_M\cdot G_{HS}\cdot V_{AMP,IN}+I_{BIAS}$$

$$I_{MIN}=I_{MODULATED,MIN}+I_{BIAS}=G_M\cdot V_{DIFF,MIN}+I_{BIAS}=-$$
$$G_M\cdot G_{HS}\cdot V_{AMP,IN}+I_{BIAS}$$

Furthermore, the extinction ratio (ER) can be defined as:

$$ER=\frac{I_{MAX}}{I_{MIN}}=\frac{P_{MAX}}{P_{MIN}},$$

wherein $P_{MAX}$ is the maximal optical power level and wherein $P_{MIN}$ is the minimal optical power level.

Said extinction ratio (ER) can be measured for example in decibel (dB) and also be expressed as:

$$ER_{dB} = 10 \cdot \log_{10} \frac{I_{MAX}}{I_{MIN}} = 10 \cdot \log_{10} \frac{P_{MAX}}{P_{MIN}}$$

Using the extinction ratio (ER), one can define $I_{MAX}$ and $I_{MIN}$ as a function of $I_{BIAS}$ and ER, for example as:

$$I_{MAX} = \frac{2 \cdot I_{BIAS}}{ER+1} \cdot ER$$

$$I_{MIN} = \frac{2 \cdot I_{BIAS}}{ER+1}$$

From this it follows that the modulation current modulation amplitude ($I_{AMP}$) can be defined as:

$$I_{AMP} = I_{MAX} - I_{MIN} = 2 \cdot \frac{ER-1}{ER+1} \cdot I_{BIAS}$$

In other words, in this example, $I_{AMP}$ is a function depending only on two variables, the modulation current modulation amplitude $I_{BIAS}$ and the extinction ratio (ER).

The low-frequency control path can comprise a low-frequency input signal amplitude estimator configured for generating a signal in dependence of the amplitude of the input signal, in particular for generating a low-frequency direct current component signal in dependence of the amplitude of the input signal.

The input signal amplitude ($V_{AMP,IN}$) can define the maximum and minimum values reachable for the differential voltage input signal ($V_{DIFF,IN}$), i.e. $V_{DIFF,IN} = V_{AMP,IN} \cdot x$, with $-1 < x < 1$ The exemplary generation of a signal ($V_{AMP}$) in dependence of the amplitude of the input signal ($V_{AMP,IN}$) by the low-frequency input signal amplitude estimator can inter alia comprise generating: $V_{AMP} = G_{DC} \cdot k \cdot V_{AMP,IN}$, wherein k is the gain of the low-frequency input signal amplitude estimator and is defined as $$k = \frac{V_{AMP,ESTIMATOR}}{V_{AMP,IN}},$$

wherein $V_{AMP,ESTIMATOR}$ is the estimated or detected input signal amplitude, and wherein $G_{DC}$ is the gain of the direct current component of the low-frequency control path defined as $$G_{DC} = \frac{V_{AMP}}{V_{AMP,ESTIMATOR}}$$

Therein the estimated or detected input signal amplitude $V_{AMP,ESTIMATOR}$ may, for example, be derived by means of an envelope detector (k=1), a Root-Mean-Squared (RMS) value detector $$(k = \frac{1}{\sqrt{3}},$$

for the case or a uniformly distributed signal used in plastic fiber optics), or other means, e.g. a common mode value voltage detector.

In other words, the low-frequency input signal amplitude estimator can comprises an envelope detector and/or a root-mean-squared value detector and/or a common mode value voltage detector.

The low-frequency control path can further comprise a low-frequency control circuit configured for generating a trans-conductance in dependence of the signal generated by the low-frequency input signal amplitude estimator.

For example, the low-frequency control circuit can be configured to generate a trans-conductance ($G_M$) in dependence of $V_{AMP}$, which, as shown above, can, for example, be generated by the low-frequency input signal amplitude estimator from the input signal amplitude ($V_{AMP,IN}$) via $V_{AMP} = G_{DC} \cdot k \cdot V_{AMP,IN}$.

Furthermore, the low-frequency control circuit can be configured for controlling the trans-conductance ($G_M$) of the high-speed trans-conductance amplifier based on the trans-conductance generated by the low-frequency control circuit in dependence of the signal generated by the low-frequency input signal amplitude estimator.

The low-frequency control circuit can be based on a proportional-integral (PI) controller. For example, the low-frequency control circuit can comprise a low-speed trans-conductance amplifier and a proportional-integral controller.

For controlling the trans-conductance ($G_M$) of the high-speed trans-conductance amplifier of the high-speed signal path, the low-frequency control circuit can be configured to operate, for example as a control feedback loop, according to the following exemplary control relations.

1. $I_{AMP}$ is a function depending only on two variables $I_{BIAS}$ and ER:

$$I_{AMP} = I_{MAX} - I_{MIN} = 2 \cdot \frac{ER-1}{ER+1} \cdot I_{BIAS}$$

2. Both $I_{MAX}$ and $I_{MIN}$ depend on the input amplitude: $2 \cdot G_M \cdot G_{HS} \cdot V_{AMP,IN} = I_{MAX} - I_{MIN}$ Therefore:

$$G_M \cdot G_{HS} \cdot V_{AMP,IN} = \frac{ER-1}{ER+1} \cdot I_{BIAS}$$

3. However, the observable input amplitude signal is not $V_{AMP,IN}$ but can be $V_{AMP}$ given by the input signal amplitude estimator: $V_{AMP} = G_{DC} \cdot k \cdot V_{AMP,IN}$ Therefore:

$$G_M \cdot V_{AMP} = \frac{ER-1}{ER+1} \cdot I_{BIAS} \cdot k \cdot \frac{G_{DC}}{G_{HS}} = I_{REF}$$

4. Consequently, $I_{REF}$ can be a function of ER, $I_{BIAS}$, k and $$\frac{G_{DC}}{G_{HS}}$$

matching. It is furthermore noted that $G_{DC}$ may be equal to $G_{HS}$.

5. Therefore, by regulating $G_M \cdot V_{AMP} = I_{REF}$, the extinction ratio ER can be controlled and kept constant, since all other variables ($I_{BIAS}$, k and $$\frac{G_{DC}}{G_{HS}})$$

can also be constant.

Moreover, for example, when the input signal amplitude ($V_{AMP,IN}$) is reduced (increased) the low-frequency control circuit can increase (decrease) the trans-conductance ($G_M$) to compensate for variations of the input signal amplitude ($V_{AMP,IN}$).

In addition PVT variations of the low-speed or low-frequency control path gain ($G_M \cdot G_{DC}$) can thereby also be compensated.

Furthermore, $I_{BIAS}$ can, for example, be kept constant by means of a known band gap and known current conveyor circuitry of the low-frequency control circuit.

By controlling $I_{BIAS}$, e.g. keeping $I_{BIAS}$ constant, the polarization of the light emitted by the LED can be fixed and controlled.

This exemplary architecture allows compensating even for small undesired variations of $I_{BIAS}$ due to PVT variations. Said variations do not influence the extinction ratio ER value, since both $I_{MIN}$ and $I_{MIN}$ can be proportional to $I_{BIAS}$. This is because the low-frequency control circuit can move/change/control $I_{Ref}$ together with $I_{BIAS}$ in order to keep the extinction ratio ER constant.

For example, the exemplary architecture of a light emitting diode driving circuit described herein may allow compensation of physical parameter variations, e.g. variations in $I_{BIAS}$, resistance, capacitance, trans-conductance values etc., due to PVT variations. In particular, for example, PVT induced variations of said physical parameters of up to 15%, 20% or more can be compensated. Furthermore, also variations of physical parameters of circuit components such as a bandgap or a current conveyor due to PVT variations can easily be compensated.

In other words, the light emitting diode driving circuit can be configured for keeping the light emitting diode polarization and extinction ratio constant.

The light emitting diode driving circuit further can comprise a pre-emphasis block, wherein the pre-emphasis block can comprise a high-speed pre-emphasis block for applying a pre-emphasis with a high-speed gain over the input signal and wherein a low-speed replica block can apply a low-frequency gain to the signal generated by the low-frequency input signal amplitude estimator, and wherein the high-speed gain value can match or be proportional to the low-frequency gain value.

By applying such a pre-emphasis the bandwidth of the LED, and consequently the bandwidth of the optical communication system comprising the driver and the LED, can be improved.

For example, the bandwidth of a red AlGaInP (aluminium gallium indium phosphide) LED can be increased from its normal 80 MHz up to more than 150 MHz.

For example, a high-speed pre-emphasis block in the high-speed signal path can apply a pre-emphasis with a gain $G_{HS}^{PE}$ over the differential signal $V_{DIFF}$, for example, $V_{DIFF,PE} = G_{HS}^{PE} \cdot V_{DIFF}$ In parallel a low-speed replica block, i.e. without pre-emphasis, can, for example, apply the same low-frequency gain ($G_{DC}^{PE} = G_{HS}^{PE}$) to the signal $V_{AMP}$ holding the input amplitude information, i.e., for example, $V_{AMP,PE} = G_{DC}^{PE} \cdot V_{AMP}$ In consequence, a matching of both gains can guarantee an accurate extinction ratio ER control similar to the case, as exemplary presented above, without pre-emphasis.

Herein and in the following, the term replica of block can inter alia be understood as a copy of a block, wherein the replica can have a different scale, e.g. different spatial dimensions, as compared to the original replicated block, and wherein a block can, for example, comprise electronic components such as resistors and transistors.

For example, the low-frequency control path driving circuit components, e.g. resistors and transistors, can have larger physical dimensions than the high-speed signal path driving circuit components. A larger size of the low-frequency control path driving circuit components can inter alia reduce local process variations and consequently reduce extinction ratio errors.

At the opposite, smaller high-speed signal path driving circuit components can, for example, inter alia provide high signal speed and high linearity at moderate power consumption levels.

For example, typical replica factors or scale factors describing the difference in scale of components of the low-frequency control path driving circuit as compared to the high-frequency/high-speed signal path driving circuit can be in the range of up to 10, 20 or more. Hence, for example, a resistance value of 2 kΩ may be replicated with a replica factor of 10 or 20 so that the replicated resistance value would be 20 kΩ or 40 kΩ

In order to avoid optical clipping and also to limit the maximum current drained from the LED for reliability reasons, a pre-emphasis function can be configured such, that its zero, $f_{ZERO}$, and pole frequency position, $f_{POLE}$, can be accurately controlled and its high-frequency gain can be limited.

Therein, for example, a zero can be understood as a single-frequency point of pushing a gain up, and a pole as a single-frequency point of pulling the gain down.

For example, a one pole-one zero based pre-emphasis function can be used, which can take on, for example, the following form:

$$F(S)_{PRE-EMPHASIS} = \frac{V_{OUT}}{V_{IN}} =$$

$$\frac{V_{DIFF,PE}}{V_{DIFF}} = A_V \cdot \frac{\left(1 + \frac{s}{2 \cdot \pi \cdot f_{ZERO}}\right)}{\left(1 + \frac{s}{2 \cdot \pi \cdot f_{POLE}}\right)} = A_V \cdot \frac{\left(1 + \frac{s}{2 \cdot \pi \cdot f_{ZERO}}\right)}{\left(1 + \frac{s}{2 \cdot \pi \cdot G_{PEAKING} \cdot f_{ZERO}}\right)},$$

wherein the parameter s can represent a complex angular frequency and $A_V$ can be a constant.

However, other pre-emphasis functions can also be used.

Furthermore, the optional pre-emphasis block can be combined with the input signal conditioner into a single block, wherein the high-speed differential input signal conditioner can be merged with the high-speed pre-emphasis block, and wherein low-frequency input signal amplitude estimator can be merged with a/the low-speed pre-emphasis replica block.

The light emitting diode driving circuit can further comprise a calibration block for correcting possible offsets in the high-speed signal path, wherein, for example, the calibration block can be implemented in the high-speed trans-conductance amplifier.

Such an optional additional calibration block can inter alia correct extinction ratio errors not corrected, for example, possible extinction ratio errors arising from the different physical scales of electronic components, such as resistors and transistors, in the high-speed signal path, in particular, for example, arising from local process variations occurring in the high-speed signal path components.

Said optional additional calibration block can comprise a proportional-integral (PI) controller. Furthermore, such a calibration block can be implemented at the later stages of the light emitting diode driving circuit, such as, for example, in the high-speed trans-conductance amplifier, to be more effective.

The calibration block can inter alia add a pole calibration frequency, $f_{POLE,CALIBRATION}$, to the signal that, for example, is smaller than the minimum signal frequency, $f_{MIN,SIGNAL}$, in order to avoid the risk of removing transmitted signal frequencies of interest during the calibration operation.

The light emitting diode driving circuit can comprise a high-speed differential input signal conditioner comprising a unity buffer and two resistors and/or the light emitting diode driving circuit can comprise a low-frequency input signal amplitude estimator that comprises a unity buffer and two resistors.

For example, a CMOS (complementary metal-oxide-semiconductor) unity buffer in the high-speed differential input signal conditioner can isolate the input termination impedance and can increase (decrease) the voltage level signal by a voltage $$V_{GS} = V_{TH} + \sqrt{\frac{2 \cdot I_{POLAR,HS}}{\mu \cdot C_{OX} \cdot \left(\frac{W}{L}\right)}},$$

wherein:
$V_{GS}$ is the gate to source voltage of a CMOS transistor,
$V_{TH}$ is the threshold voltage of a CMOS transistor,
$I_{POLAR,HS}$ is the polarization current flowing through the CMOS transistor in the high-speed input signal conditioner buffer,
$\mu$ is the mobility of charge carriers,
$C_{OX}$ is the gate oxide capacitance of a CMOS transistor, and
W and L are respectively the width and the length of a CMOS transistor, and by applying a gain, $$G_{HS} = \frac{g_m}{g_m + g_{mb}}$$

wherein:
$g_m$ is the small-signal trans-conductance related to the gate-to-source voltage in a CMOS transistor, and
$g_{mb}$ is the small-signal trans-conductance related to the bulk-to-source voltage in a CMOS transistor.

A corresponding replica unity buffer in the low-frequency control path and two resistors can be used to generate the estimated input signal amplitude based on an input signal common-mode voltage detector ($V_{CM}$) which keeps an exact relation with the input signal amplitude:

$$V_{AMP,ESTIMATOR} = \frac{V_{AMP,IN}}{2} = \frac{(V_{IP} + V_{IN})}{2} = V_{CM}\left(k = \frac{1}{2}\right)$$

$$V_{AMP} = \frac{V_{AMP,IN}}{2} \cdot G_{DC} = \frac{(V_{IP} + V_{IN})}{2} \cdot G_{DC} = V_{CM} \cdot G_{DC}$$

with the same gain $$G_{DC} = \frac{g_{m,DC}}{g_{m,DC} + g_{mb,DC}} = G_{HS}$$

Thereby accurate, high-speed and low-noise differential input signal conditioning can be carried out, in particular for moderate values of $I_{POLAR,HS}$, as for example in the range of a few mA, e.g. 2 mA.

Furthermore, the current density in the high-speed input signal conditioner and in the low-frequency input signal amplitude estimator can be the same to facilitate gain matching of the gains $G_{DC}$ and $G_{HS}$.

The high-speed differential input signal conditioner can, for example, also comprise at least one operational amplifier (opamp) with negative feedback and/or the light emitting diode driving circuit can comprise a low-frequency input signal amplitude estimator comprising at least one operational amplifier with negative feedback.

For example, the gains of the signal path and the control path can be $$G_{HS} = \frac{R_2}{R_1} = G_{DC} = \frac{f_{REPLICA} \cdot R_2}{f_{REPLICA} \cdot R_1},$$

wherein $R_1$, $R_2$ are resistances and $f_{REPLICA}$ is a scale factor.

In other words the feedback resistors in the low-frequency input signal amplitude estimator can be designed $f_{REPLICA}$ times larger than the replicated high-speed differential input signal conditioner feedback resistors. Choosing the use of larger components for the low-frequency input signal amplitude estimator can improve precision and matching of the low-frequency input signal amplitude estimator and reduce power consumption.

Nevertheless the resistors in the low-frequency input signal amplitude estimator and in the high-speed differential input signal conditioner can, for example, have the same form factor, as to better be able to match over all PVT conditions.

An identical Common-Mode-Feedback (CMFB) circuit can be used in both high-speed signal path and low-frequency path opamps for better matching.

Furthermore, $R_1$ can be chosen to be larger than the LED driver input termination resistance $R_{TERM,DRIVER}$, so as to avoid that the driver input termination impedance is affected by $R_1$.

Also a larger $R_1$ can inter alia reduce errors in the common-mode input voltages, as illustrated in the following.

For example, due to the difference between the common-mode (CM) voltage at the output ($V_{DIFF,CM}$) and at the input ($V_{CM}=0.5 \cdot (V_{IN}+V_{IP})$) of the high-speed differential input signal conditioner operational amplifier, an error common-mode current ($I_{CM,ERROR}$) can flow from the opamp output to the input termination impedance $$I_{CM,ERROR} = \frac{(V_{DIFF,CM} - V_{CM})}{R_1 + R_2},$$

and which translates into a common-mode voltage error ($V_{CM,ERROR}$):

$$V_{CM,ERROR} = \frac{(R_{TERM,DRIVER} \parallel R_{TERM,DAC})}{R_1 + R_2} \cdot (V_{DIFF,CM} - V_{CM}),$$

wherein $R_{TERM,DAC}$ is, for example, the resistance of current steering digital-to-analog converter (DAC), which can serve to generate the input signal received by the light emitting diode driving circuit.

The exemplarily described use of negative feedback can ensure a high linearity of the signal processing in the light emitting diode driving circuit. The thermal noise generated by feedback network resistors, the higher power consumption required by the operational amplifier and the above described common-mode voltage error ($V_{CM,ERROR}$) are the drawbacks of the exemplarily described use of one operational amplifier (opamp) with negative feedback.

It is also conceivable that, that an/the optional pre-emphasis block also can comprise at least one operational amplifier with negative feedback.

For example, in a possible high-speed block of a possible pre-emphasis block a low-frequency gain can be defined by a resistor ratio $$G_{HS}^{PE} = \frac{R_2}{R_1}$$

and a high-frequency gain can be defined by a capacitor ratio $$G_{HS}^{PE} \cdot G_{PEAKING} = \frac{C_1}{C_2}.$$

Consequently $$G_{PEAKING} = \frac{C_1 \cdot R_2}{C_2 \cdot R_1},$$

and the zero position of the exemplary one-pole one-zero pre-emphasis function is $$f_{ZERO} = \frac{1}{2\pi R_1 \cdot C_1}$$

and the pole position is $$f_{POLE} = \frac{1}{2\pi R_2 \cdot C_2}.$$

In other words in this example, the zero/pole positions and the high-frequency gain are only dependent on passive devices ($C_1$, $C_2$ and $R_1$, $R_2$), which are generally well controlled and undergo just small process variations.

In the low-frequency path, a pre-emphasis replica path can be used in order to obtain the same gain $$G_{DC}^{PE} = \frac{f_{REPLICA} \cdot R_2}{f_{REPLICA} \cdot R_1} = G_{HS}^{PE}$$

It is possible to use a negative feedback opamp configuration, for example as described above, in both input signal conditioner and pre-emphasis circuits, thereby merging the two functionalities of signal conditioning and pre-emphasis in a single block or circuit to reduce power consumption.

A light emitting diode driving circuit can comprise a single-ended (single-output) high-speed trans-conductance amplifier, or a fully differential high-speed trans-conductance amplifier A possible fully differential high-speed trans-conductance amplifier can thereby be configured such that a current of same value but opposite sense as the current flowing through the light emitting diode is also flowing through a dummy resistance that can replicate the equivalent low-frequency impedance of the LED.

This can inter alia improve the power supply rejection ratio (PSRR).

The low-frequency control circuit can comprise a single-ended or fully-differential low-speed trans-conductance amplifier and a proportional-integral controller.

It is further possible, that a calibration block (offset calibration block) for correcting possible offsets in the high-speed signal path, as for example described earlier, is implemented at the high-speed trans-conductance amplifier input(s) or also at later stages inside the high-speed trans-conductance amplifier.

The calibration block to eliminate an offset in the high-speed differential signal can comprise a proportional-integral (PI) controller implemented by means of a high direct current (DC) gain $A_{V,CALIBRATION,PI\ CONTROL}$ amplifier whose bandwidth can be defined by a capacitor $C_{LARGE}$.

To satisfy $f_{POLE,CALIBRATION} < f_{MIN,SIGNAL}$ the bandwidth of the $A_{V,CALIBRATION,PI\ CONTROL}$ amplifier can be limited. A sufficient low enough $f_{POLE,CALIBRATION}$ can, for example, be obtained by using one or more sufficiently large capacitors $C_{LARGE}$.

An exemplary optical transmitter according to the invention for use in an optical communication system can comprise:

at least one light emitting diode, and
at least one light emitting diode driving circuit according to any of the configurations described above and/or according to any possible combination of the exemplarily features described above.

In summary the architecture, exemplarily described above, of a light emitting diode driving circuit or an optical transmitter for use in an optical communication system can inter alia provide:

a well controlled extinction ratio
a compensation of input signal amplitude and PVT variations
offset calibration of the high-speed signal path
a constant LED polarization (a constant $I_{BIAS}$)
control of pre-emphasis pole/zero frequency positions and pre-emphasis high-frequency gains
well controlled optical clipping and reliable maximum LED peak current high-bandwidth and high-linearity in order to accommodate high-speed optical communications based on linear modulations.

DESCRIPTION OF DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
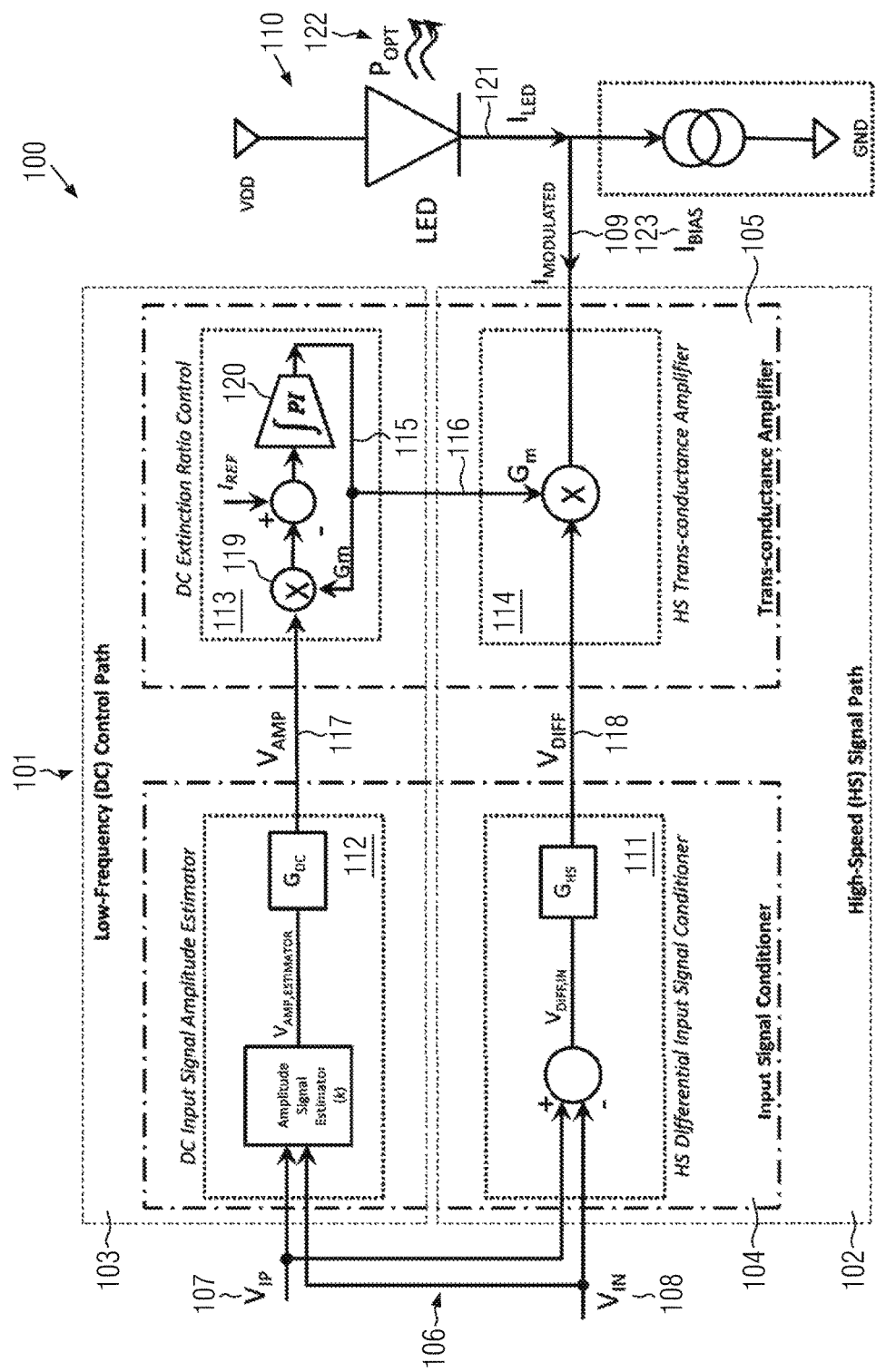
FIG. 1: Exemplary schematic architecture of a light emitting diode driving circuit for use in an optical transmitter

FIG. 1 shows a possible architecture of a light emitting diode driving circuit 101 driving a light emitting diode 110 for use in an optical transmitter 100.

The driving circuit or driver 101 can thereby, for example, comprise a high-speed signal path 102 comprising a high-speed trans-conductance amplifier 114 configured for a linear transformation of an input signal 106 to an output signal 109 for linear modulation of a light emitting diode 110.

The driving circuit 101 can further comprise a low-frequency control path 103, that can be configured for generating a trans-conductance 115 ($G_M$) in dependence of a low-frequency component of the input signal 106, for example in dependence of the input signal amplitude.

Furthermore, the low-frequency control path 103 can be configured for controlling the trans-conductance 116 of the high-speed trans-conductance amplifier based on the trans-conductance 115 generated by the low-frequency control path 103.

Therein the input signal 106 can be a differential input signal, for example a differential voltage input signal ($V_{DIFF,IN}$) defined by the difference of two voltage inputs, for example by the difference of a voltage at an inverting input 108 ($V_{IN}$) and a voltage at a non-inverting input 107 ($V_{IP}$).

The high-speed signal path 102 can further comprise a high-speed differential input signal conditioner 111 for applying a gain, e.g. $G_{HS}$, to the differential input signal 106, thereby generating a signal 118 ($V_{DIFF}$) that can serve as input to the high-speed trans-conductance amplifier 114.

The low-frequency control path 103 can further comprises a low-frequency input signal amplitude estimator 112 that can be configured for generating a signal 117 ($V_{AMP}$) in dependence of the amplitude of the input signal 106, wherein, for example, a gain, e.g. $G_{DC}$, can be applied to the estimated or detected input signal amplitude $V_{AMP,ESTIMATOR}$.

Furthermore, the low-frequency control path 103 can comprise a low-frequency control circuit 113 configured for generating a trans-conductance 115 in dependence of the signal 117 generated by the low-frequency input signal amplitude estimator 112 and the low-frequency control circuit 113 can further be configured for controlling the trans-conductance 116 of the high-speed trans-conductance amplifier 114 based on the trans-conductance 115 generated by the low-frequency control circuit 113 in dependence of the signal 117 generated by the low-frequency input signal amplitude estimator 112.

This control of the trans-conductance 116 of the high-speed trans-conductance amplifier 114 based on the trans-conductance 115 generated by the low-frequency control circuit 113 can, for example, be based on the control laws described above.

Thereby the low-frequency control circuit 113 can, for example, comprise a low-speed trans-conductance amplifier 119 and a proportional-integral controller 120.

The modulated current ($I_{MODULATED}$), i.e. for example the output signal 109 for a linear modulation of the light emitting diode, flowing through the LED 110 can be proportional to the amplifier trans-conductance 116 ($G_M$) and can be proportional to a differential voltage input signal $V_{DIFF,IN}$ or, as shown here in case of the application of a high-speed differential input signal conditioner, can be proportional to the conditioned signal 118 ($V_{DIFF}$). For example, the linearly modulated current ($I_{MODULATED}$) then can be expressed, as previously shown as:

$$I_{MODULATED} = G_M \cdot V_{DIFF}$$

Furthermore, a bias current ($I_{BIAS}$) 123 can in addition flow through the LED 110, so that the total current 121 ($I_{LED}$) flowing through the LED can be expressed, as also shown above, as: $I_{LED} = I_{MODULATED} + I_{BIAS}$ In other words, the shown exemplary light emitting diode driving circuit 101 architecture can also be described comprising an input signal conditioner block 104 for receiving an input signal 106 and which can comprise a high-speed differential input signal conditioner 111 and a low-frequency input signal amplitude estimator 112.

Furthermore, the shown exemplary light emitting diode driving circuit 101 architecture can comprise a trans-conductance amplifier block 105, which can comprise a high-speed trans-conductance amplifier 114 and a low-frequency control circuit 113, wherein the low-frequency control circuit 113 can be configured for controlling the trans-conductance 116 of the high-speed trans-conductance amplifier 114.

Figure 2:
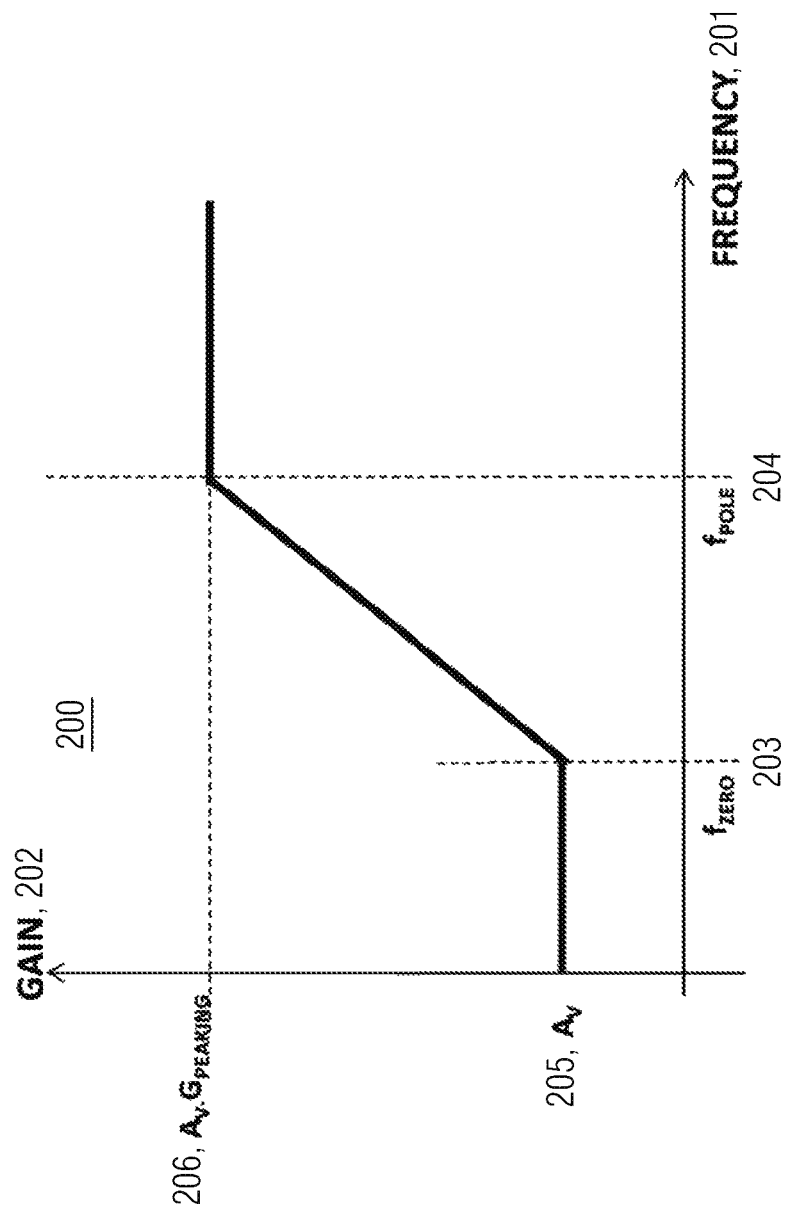
FIG. 2: Exemplary pre-emphasis function

FIG. 2 exemplary shows a possible example of a pre-emphasis function 200, wherein its gain 202 is plotted in dependence of frequency 201.

In particular, the pre-emphasis function 200 can, for example, be one pole-one zero pre-emphasis function 200, with zero position 203 ($f_{ZERO}$) and pole position 204

($f_{POLE}$), where the pre-emphasis function 200 can for example take on the values 205 ($A_V$) and 206 ($A_V \cdot G_{PEAKING}$).

Figure 3:
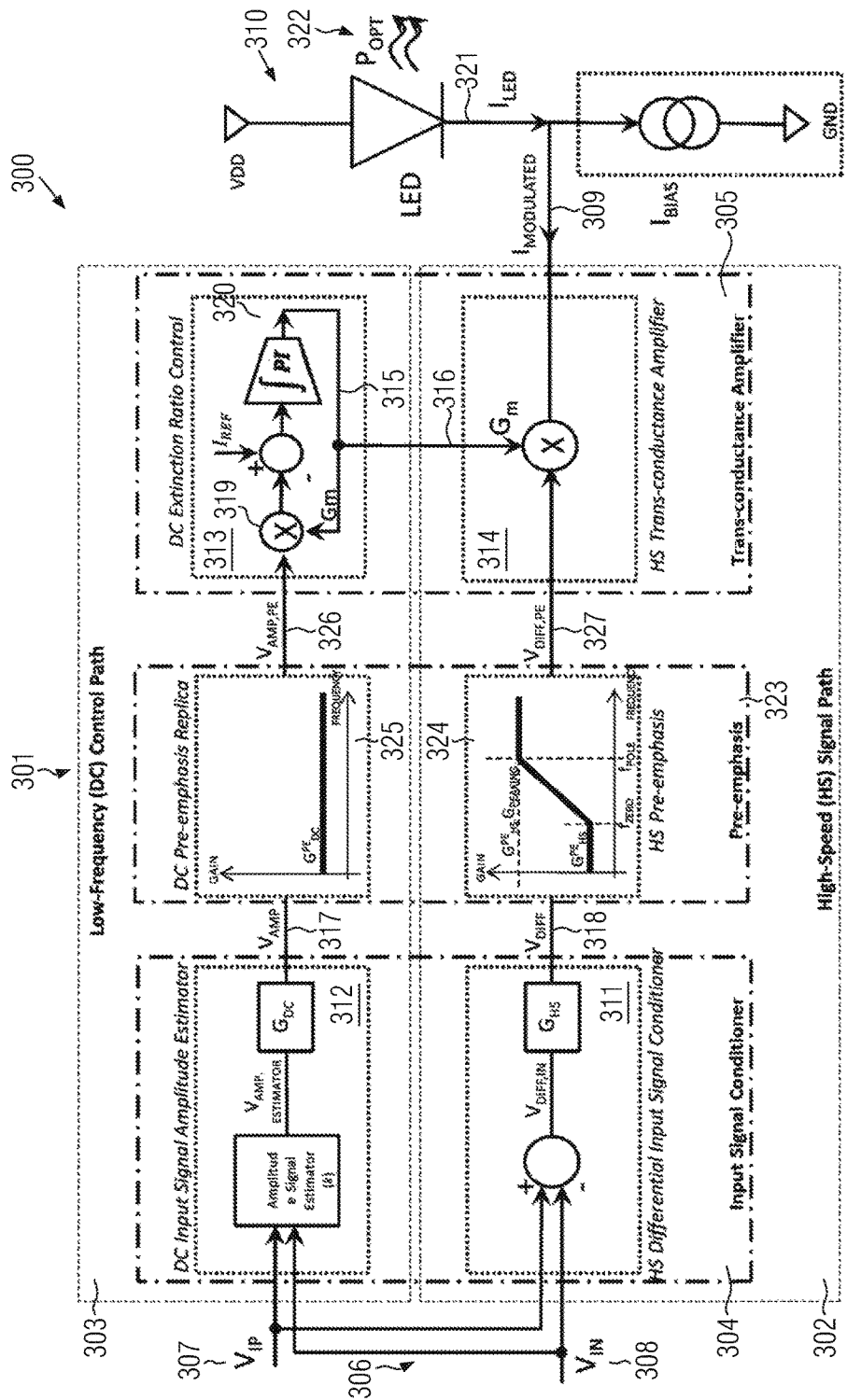
FIG. 3: Exemplary schematic architecture of a light emitting diode driving circuit with exemplary pre-emphasis

FIG. 3 shows a further example of possible architecture of a light emitting diode driving circuit 301 driving a light emitting diode 310 for use in an optical transmitter 300.

Analog to the exemplary light emitting diode driving circuit 101 of FIG. 1, the driving circuit or driver 301 can, for example, comprise a high-speed signal path 302 comprising a high-speed trans-conductance amplifier 314 configured for a linear transformation of an input signal 306 to an output signal 309 for linear modulation of a light emitting diode 310.

The driving circuit 301 can further comprise a low-frequency control path 303, that can be configured for generating a trans-conductance 315 ($G_M$) in dependence of a low-frequency component of the input signal 306, for example in dependence of the input signal amplitude.

Furthermore, the low-frequency control path 303 can be configured for controlling the trans-conductance 316 of the high-speed trans-conductance amplifier based on the trans-conductance 315 generated by the low-frequency control path 303.

Again the input signal 306 can be a differential input signal, for example a differential voltage input signal ($V_{DIFF,IN}$) defined by the difference of two voltage inputs, for example by the difference of a voltage at an inverting input 308 ($V_{IN}$) and a voltage at a non-inverting input 307 ($V_{IP}$).

The high-speed signal path 302 can further comprise a high-speed differential input signal conditioner 311 for applying a gain, e.g. $G_{HS}$, to the differential input signal 306, thereby generating a signal 318 ($V_{DIFF}$).

Also the low-frequency control path 303 can further comprise a low-frequency input signal amplitude estimator 312 that can be configured for generating a signal 317 ($V_{AMP}$) in dependence of the amplitude of the input signal 306, wherein, for example, a gain, e.g. $G_{DC}$, can be applied to the estimated or detected input signal amplitude $V_{AMP,ESTIMATOR}$.

However, in addition, as compared, for example, to the driver 101 from FIG. 1, the driving circuit 301 can comprise a pre-emphasis block 323.

The exemplary pre-emphasis block 323 can comprise a high-speed block 324 for applying a pre-emphasis with a high-speed gain over the input signal, and wherein a low-speed replica block 325 can apply a low-frequency gain to the signal generated by the low-frequency input signal amplitude estimator 312, and wherein the high-speed gain value can match or be proportional the low-frequency gain value.

For example, the high-speed pre-emphasis block 324 in the high-speed signal path 302 can apply a pre-emphasis, for example, based on a one pole-one zero pre-emphasis function analog to the pre-emphasis 200 of FIG. 2 and with a high-speed gain $G_{HS}^{PE}$ over the differential signal $V_{DIFF}$, for example, thereby generating the signal 327 $V_{DIFF,PE}=G_{HS}^{PE} \cdot V_{DIFF}$ In parallel a low-speed replica block 325, i.e. without pre-emphasis, in the low-speed/low-frequency control path 303 can apply the same low-frequency gain ($G_{DC}^{PE}=G_{HS}^{PE}$) to the signal $V_{AMP}$ generated by the low-frequency input signal amplitude estimator 312 and which holds the input amplitude information, and thereby can generate the signal $V_{AMP,PE}=G_{DC}^{PE} \cdot V_{AMP}$ Furthermore, the low-frequency control path 303 can comprise a low-frequency control circuit 313 configured for generating a trans-conductance 315 in dependence of the signal 326 ($V_{AMP,PE}$) generated by the low-speed replica block 325.

The low-frequency control circuit 313 can further be configured for controlling the trans-conductance 316 of the high-speed trans-conductance amplifier 314 based on the trans-conductance 315 generated by the low-frequency control circuit 313 in dependence of the signal 326 from the low-speed replica block 325, wherein said signal 326 in turn can depend on the signal 317 generated by the low-frequency input signal amplitude estimator 312.

Again the control of the trans-conductance 316 of the high-speed trans-conductance amplifier 314 based on the trans-conductance 315 generated by the low-frequency control circuit 313 can, for example, be based on the control laws described above in the general part.

Also, the low-frequency control circuit 313 can, for example, comprise a low-speed trans-conductance amplifier 319 and a proportional-integral controller 320.

The modulated current ($I_{MODULATED}$), i.e., for example, the output signal 309 for a linear modulation of the light emitting diode, flowing through the LED 310 can be proportional to the amplifier trans-conductance 316 ($G_M$) and can be proportional to a differential voltage input signal $V_{DIFF,IN}$ or, as shown here in case of the application of a high-speed differential input signal conditioner and pre-emphasis function, can be proportional to the conditioned and pre-emphasized signal 327 ($V_{DIFF,PE}$).

For example, the linearly modulated current ($I_{MODULATED}$) then can be expressed as: $I_{MODULATED}=G_M \cdot V_{DIFF,PE}$ Furthermore, a bias current ($I_{BIAS}$) can in addition flow through the LED 310, so that the total current 321 ($I_{LED}$) flowing through the LED can be expressed, as also shown above, as: $I_{LED}=I_{MODULATED}+I_{BIAS}$ The shown exemplary light emitting diode driving circuit 301 architecture can also be described comprising an input signal conditioner block 304 for receiving an input signal 306 and which can comprise a high-speed differential input signal conditioner 311 and a low-frequency input signal amplitude estimator 312.

Furthermore, the shown exemplary light emitting diode driving circuit 301 architecture can comprise a trans-conductance amplifier block 305, which can comprise a high-speed trans-conductance amplifier 314 and a low-frequency control circuit 313, wherein the low-frequency control circuit 313 can be configured for controlling the trans-conductance 316 of the high-speed trans-conductance amplifier 314.

The pre-emphasis block 323, for example, can be as shown be arranged between the input signal conditioner block 304 and the trans-conductance amplifier block 305.

Figure 4:
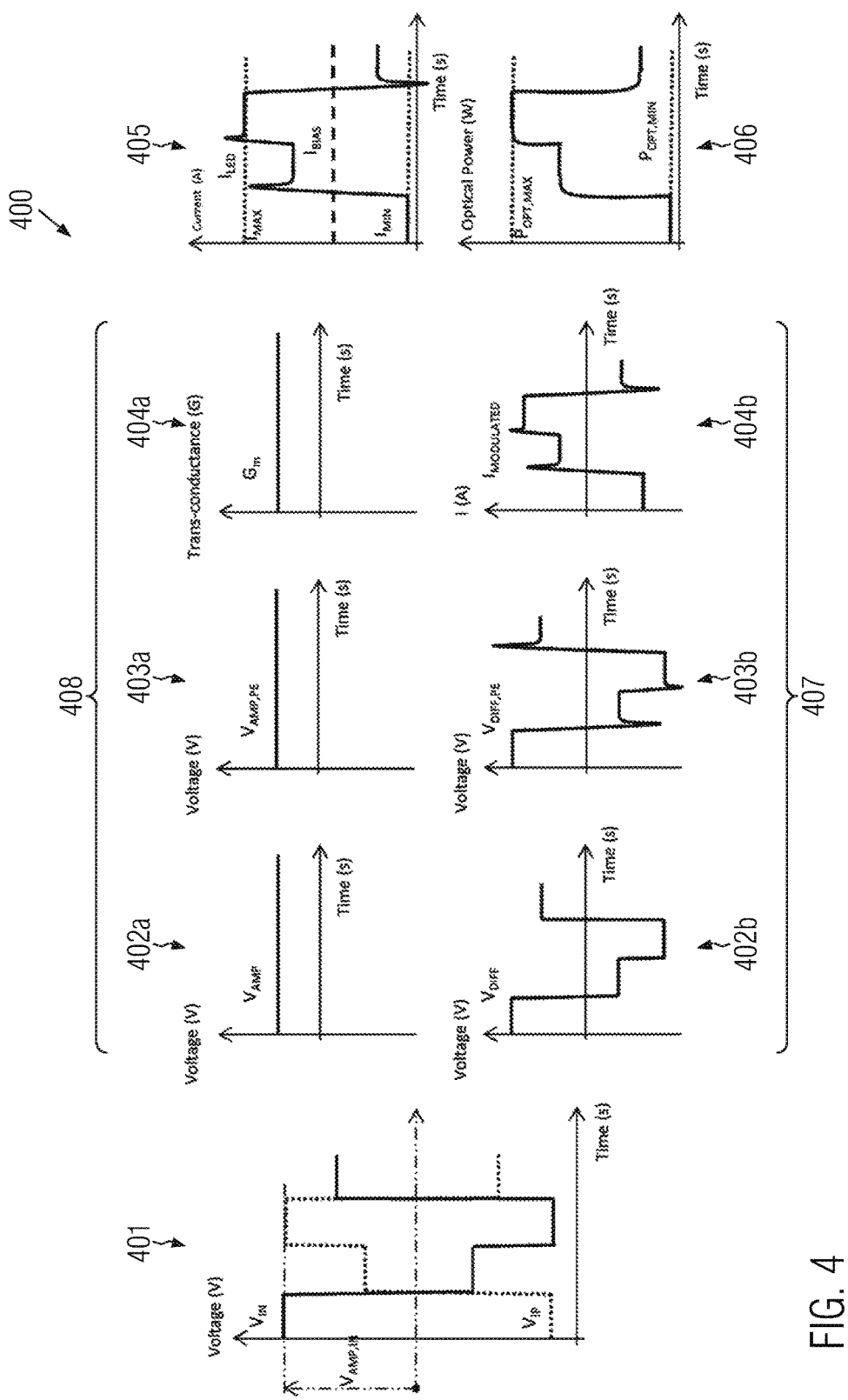
FIG. 4: Exemplary schematic signal flow in an exemplary light emitting diode driving circuit with exemplary pre-emphasis

The FIG. 4 shows an exemplary signal flow 400 in an exemplary light emitting diode driving circuit with pre-emphasis, for example a signal flow that could occur in exemplary light emitting diode driving circuit with pre-emphasis analog or identical to a light emitting diode driving circuit 301 shown in FIG. 3.

For example, a time varying differential voltage input signal 401 may be supplied as input to the low-frequency control path 408 and the high-speed signal path 407 of the light emitting diode driving circuit (not shown).

The voltage signal and/or a trans-conductance across parts or the whole of the low-frequency control path 408 can, for example, be essentially flat and stable.

In other words, the voltage signal 402a in the low-frequency input signal amplitude estimator and/or the voltage signal 403a in the low-speed replica block (not shown) and/or the trans-conductance signal 404a in the low-speed/low-frequency control circuit (not shown) can be practically constant along time.

In contrast thereto the voltage signal across the high-speed signal path 407 can vary proportionally in dependence of the input signal 401, i.e. the voltage signal 402b in the high-speed differential input signal conditioner (not shown) and/or the voltage signal 403b in the high-speed pre-emphasis block (not shown) can vary proportionally in dependence of the input signal 401, leading to the exemplary linearly modulated current output signal 404b of the high-speed trans-conductance amplifier (not shown).

For completeness also an exemplary resulting time series 405 of the total current flowing through the LED (not shown) is illustrated together with an exemplary time series 406 of the optical power output of the LED, when driven by the exemplary light emitting diode driving circuit with pre-emphasis.

Figure 5:
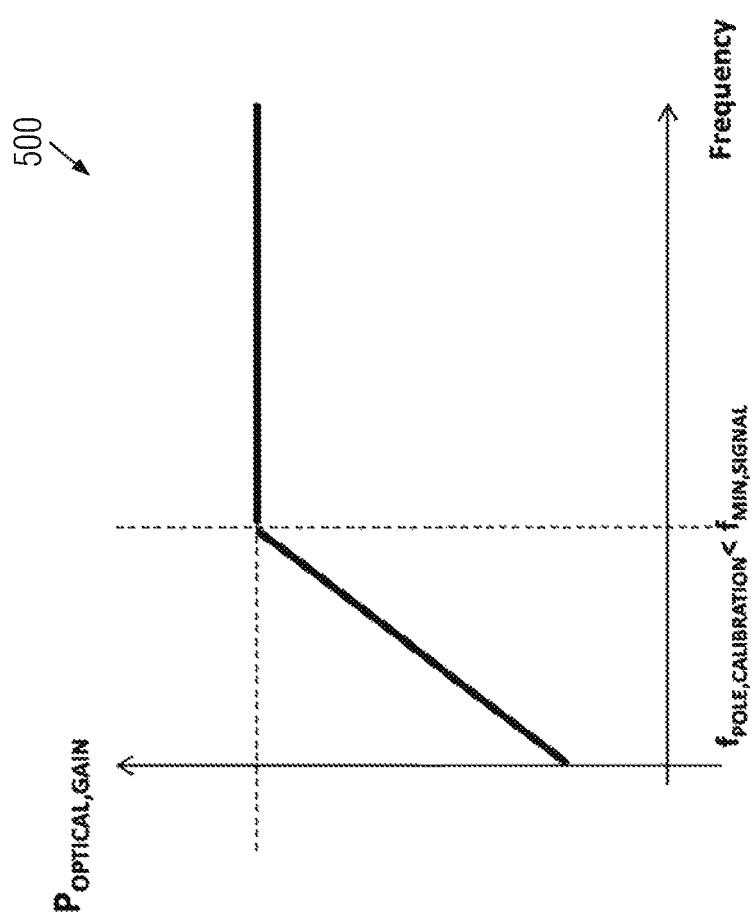
FIG. 5: Exemplary calibration function

FIG. 5 shows an exemplary calibration function 500 that can be applied to the high-speed signal by an optional calibration (not shown) for correcting possible offsets in the high-speed signal path, wherein, for example, the calibration block could be implemented in the high-speed trans-conductance amplifier (not shown).

Figure 6:
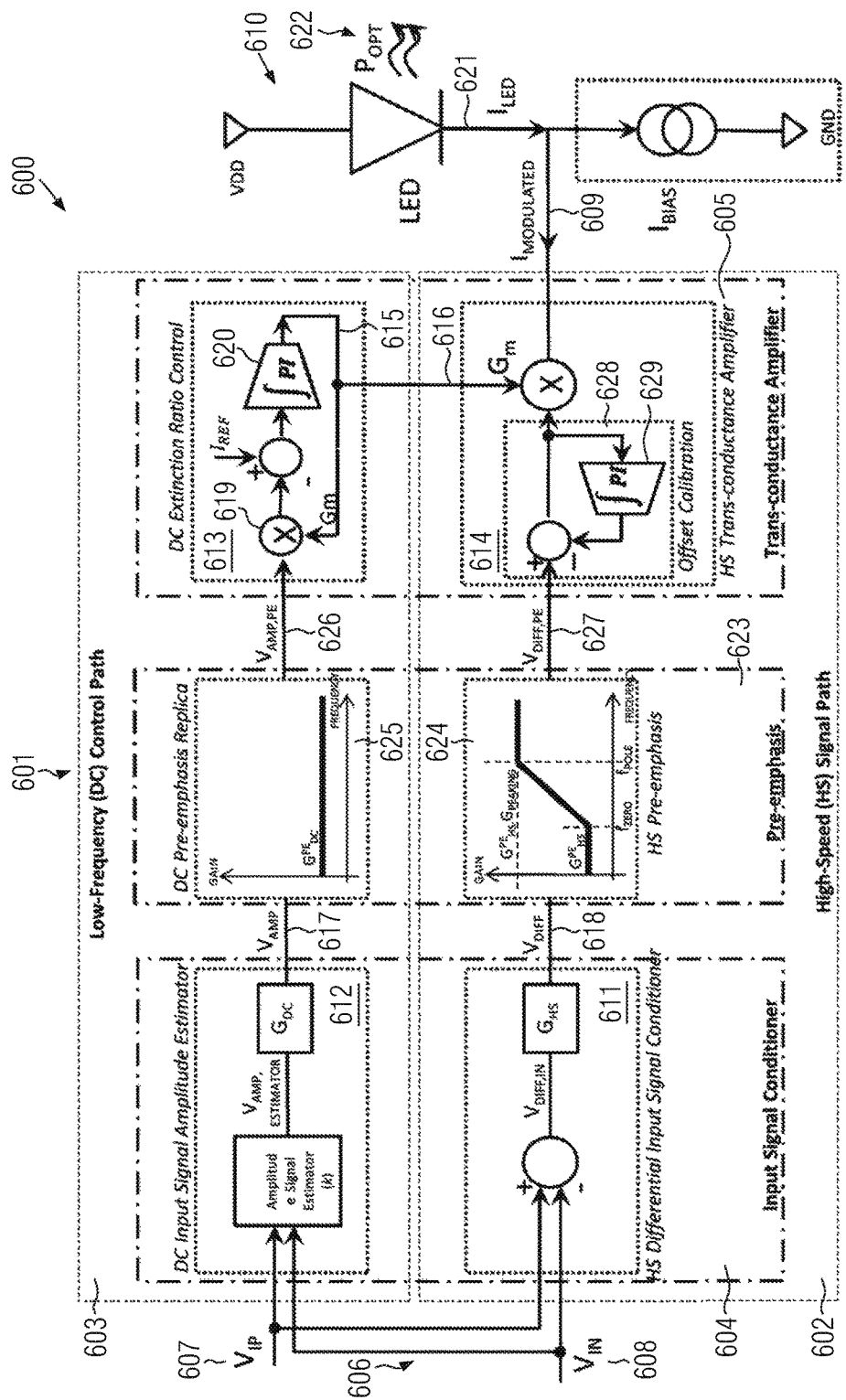
FIG. 6: Exemplary schematic architecture of a light emitting diode driving circuit with exemplary pre-emphasis and exemplary offset calibration

FIG. 6 shows a further exemplary schematic architecture of a light emitting diode driving circuit 601 for use in an optical transmitter 600.

The displayed architecture is analog or identical in large parts to the exemplary light emitting diode driving circuit 301 illustrated in FIG. 3, i.e. the components of the circuit and optical transmitter referred to by the reference numerals 600 to 627 can be analog or identical to the components of the circuit and optical transmitter referred to by the reference numerals 300 to 327 in FIG. 3.

However, in addition, the light emitting diode driving circuit 601 shown has an exemplary offset calibration block 628 for correcting possible offsets in the high-speed signal path 602, for example for correcting possible offsets arising from local process variations in components of high-speed signal path 602.

The exemplary offset calibration block 628 can, for example, be accommodated in the high-speed trans-conductance amplifier 614.

The calibration block 628 can thereby, as described earlier, comprise a proportional-integral (PI) controller 629.

Figure 7:
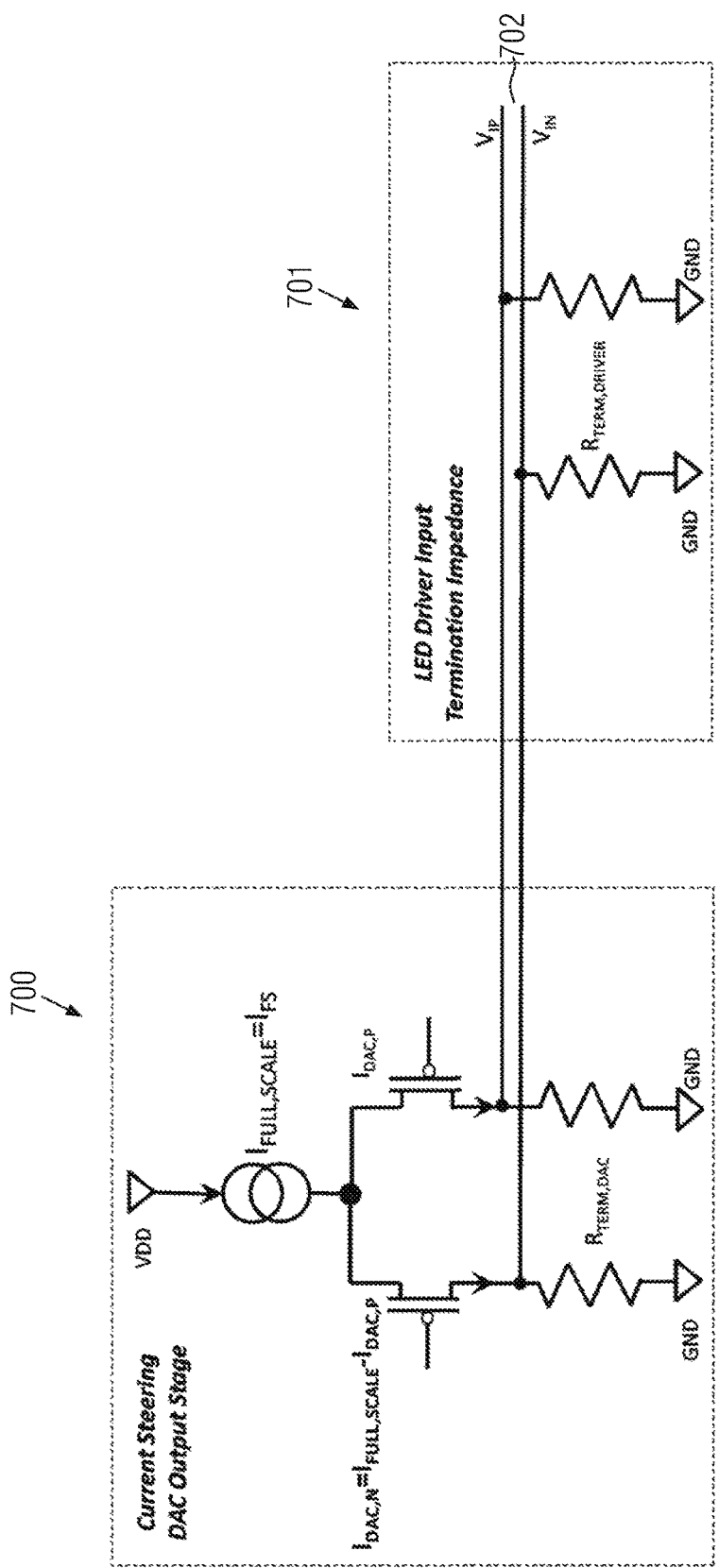
FIG. 7: Exemplary digital-to-analog converter (DAC)

FIG. 7 shows an example of a current steering digital-to-analog converter (DAC) 700 that can be used to feed an input signal, e.g. a communication signal, to the input termination 701 of light emitting diode driving circuit, for providing a differential voltage input signal 702 for the light emitting diode driving circuit.

Herein, the differential input signal amplitude $V_{AMP,IN}$ and the common mode input signal $V_{CM}$ can follow an exact relation, i.e.

$$V_{CM} = \frac{V_{AMP,IN}}{2} = \frac{V_{IP} + V_{IN}}{2}$$

Variations on the DAC full scale current $I_{FS}$ and variations on the light emitting diode driving circuit or the DAC termination resistor $R_{TERM,DAC}$ then can have the same impact on both common-mode signal and differential signal gain.

Figure 8:
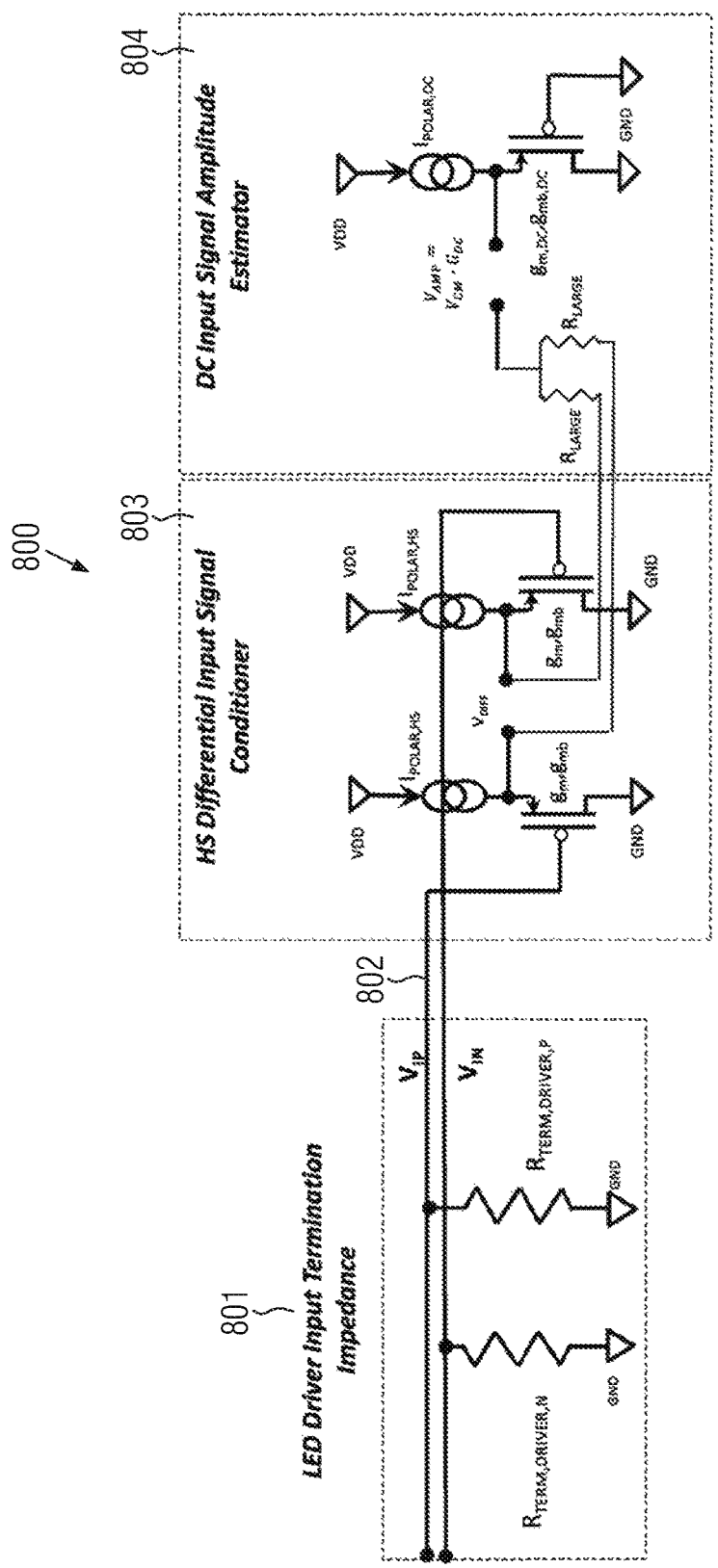
FIG. 8: Exemplary schematic architecture of an input signal conditioner block

FIG. 8 shows an example for a schematic architecture of an input signal conditioner block 800 comprising a high-speed input signal conditioner 803 and a low-frequency input signal amplitude estimator 804 and which is fed with a differential voltage input signal 802 from the input termination 801, which can be analog or identical to the input termination 701 shown in FIG. 7.

For example a PMOS (p-channel metal-oxide-semiconductor) field-effect transistor or a CMOS (complementary metal-oxide-semiconductor) field-effect transistor source follower configuration (or a NMOS, n-channel metal-oxide-semiconductor field-effect transistor, if the DAC steering is draining current) or more in general a unity buffer in the high-speed differential input signal conditioner 803 can isolate the input termination impedance and can increase (decrease) the voltage level signal by a voltage $$V_{GS} = V_{TH} + \sqrt[2]{\frac{2 \cdot I_{POLAR,HS}}{\mu \cdot C_{OX} \cdot \left(\frac{W}{L}\right)}},$$

wherein:
$V_{GS}$ is the gate to source voltage of a CMOS transistor,
$V_{TH}$ is the threshold voltage of a CMOS transistor,
$I_{POLAR,HS}$ is the polarization current flowing through the CMOS transistor in the high-speed input signal conditioner buffer,
μ is the mobility of charge carriers,
$C_{OX}$ is the gate oxide capacitance of a CMOS transistor, and
W and L are respectively the width and the length of a CMOS transistor, and by applying a gain $$G_{HS} = \frac{g_m}{g_m + g_{mb}},$$

wherein:
$g_m$ is the small-signal trans-conductance related to the gate-to-source voltage in a CMOS transistor, and
$g_{mb}$ is the small-signal trans-conductance related to the bulk-to-source voltage in a CMOS transistor.

A corresponding replica unity buffer in low-frequency input signal amplitude estimator 804 in the low-frequency control path and two resistors can be used to generate the estimated input signal amplitude based on an input signal common-mode voltage detector ($V_{CM}$) which keeps an exact relation with the input signal amplitude:

$$V_{AMP,ESTIMATOR} = \frac{V_{AMP,IN}}{2} = \frac{(V_{IP} + V_{IN})}{2} = V_{CM} \left(k = \frac{1}{2}\right)$$

$$V_{AMP} = \frac{V_{AMP,IN}}{2} \cdot G_{DC} = \frac{(V_{IP} + V_{IN})}{2} \cdot G_{DC} = V_{CM} \cdot G_{DC}$$

with the same gain $$G_{DC} = \frac{g_{m,DC}}{g_{m,DC} + g_{mb,DC}} = G_{HS}$$

Figure 9:
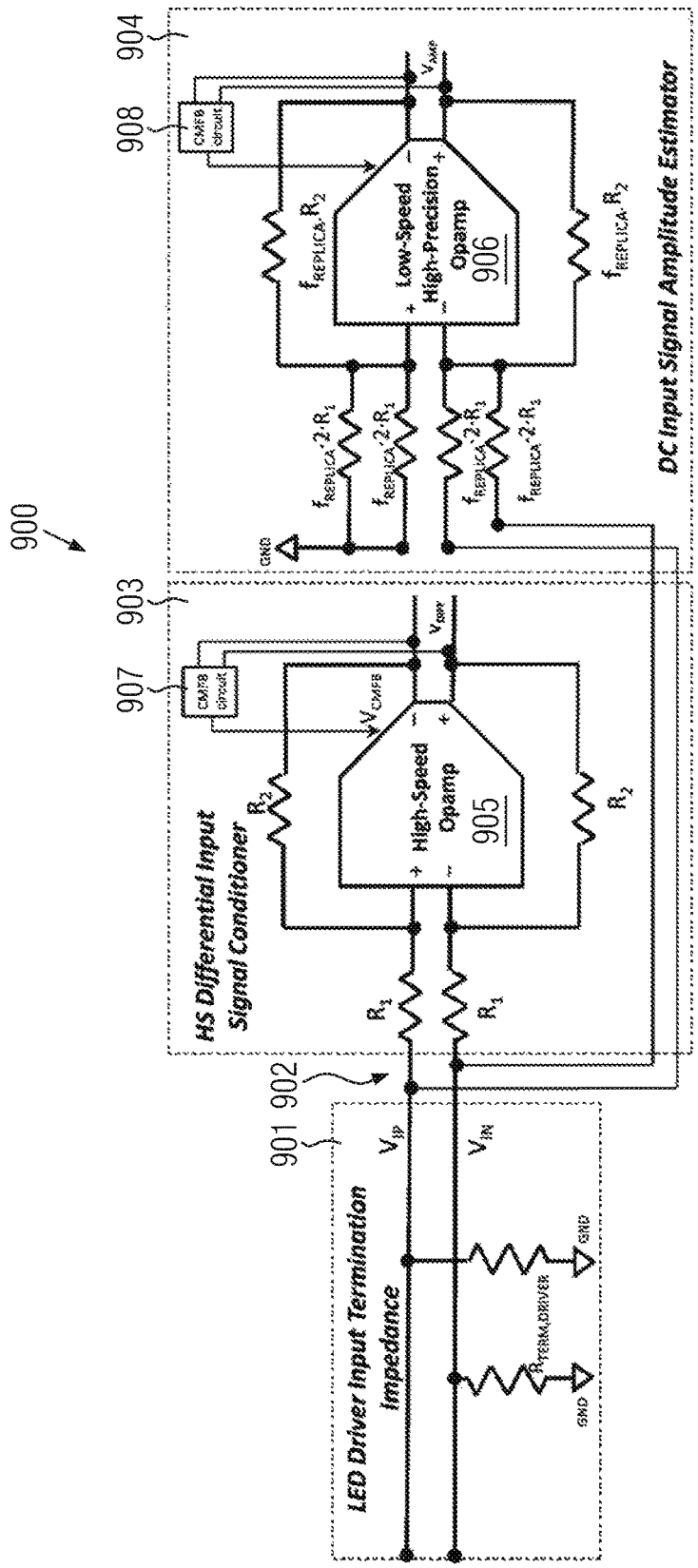
FIG. 9: Further schematic example of an input signal conditioner block

FIG. 9 shows a further example for a schematic architecture of an input signal conditioner block 900 with negative feedback comprising a high-speed input signal conditioner 903 and a low-frequency input signal amplitude estimator 904 and which is fed with a differential voltage input signal 902 from the input termination 901, which can be analog or identical to the input termination 701 shown in FIG. 7.

The high-speed differential input signal conditioner 903 of the high-speed signal path can, for example, comprise at least one operational amplifier (opamp) 905 with negative feedback.

Also the low-frequency input signal amplitude estimator 904 can comprise at least one operational amplifier 906 with negative feedback. Hence, for example, the gain $G_{HS}$ of the high-speed signal path and the gain $G_{DC}$ of the low-speed/low frequency control path can be $$G_{HS} = \frac{R_2}{R_1} = G_{DC} = \frac{f_{REPLICA} \cdot R_2}{f_{REPLICA} \cdot R_1},$$

wherein $R_1$, $R_2$ are resistances and $f_{REPLICA}$ is a scale factor.

In other words the feedback resistors in the low-frequency input signal amplitude estimator 904 can be designed $f_{REPLICA}$ times larger than the replicated high-speed differential input signal conditioner feedback resistors in the high-speed input signal conditioner 903.

Choosing the use of larger components for the low-frequency input signal amplitude estimator 904 can improve precision and matching of the low-frequency input signal amplitude estimator 904 and reduce power consumption.

Nevertheless the resistors in the low-frequency input signal amplitude estimator 904 and in the high-speed differential input signal conditioner 903 can, for example, have the same form factor, as to better be able to match over all PVT conditions.

Identical common-mode-feedback (CMFB) circuits 907, 908 can be used in both high-speed signal path and low-frequency path opamps for better matching.

Furthermore, $R_1$ can be chosen to be larger than the LED driver input termination resistance $R_{TERM,DRIVER}$, so as to avoid that the driver input termination impedance is affected by $R_1$.

Also a larger $R_1$ can inter alia reduce errors in the common-mode input voltages, as shown above in the general part of the description.

Figure 10:
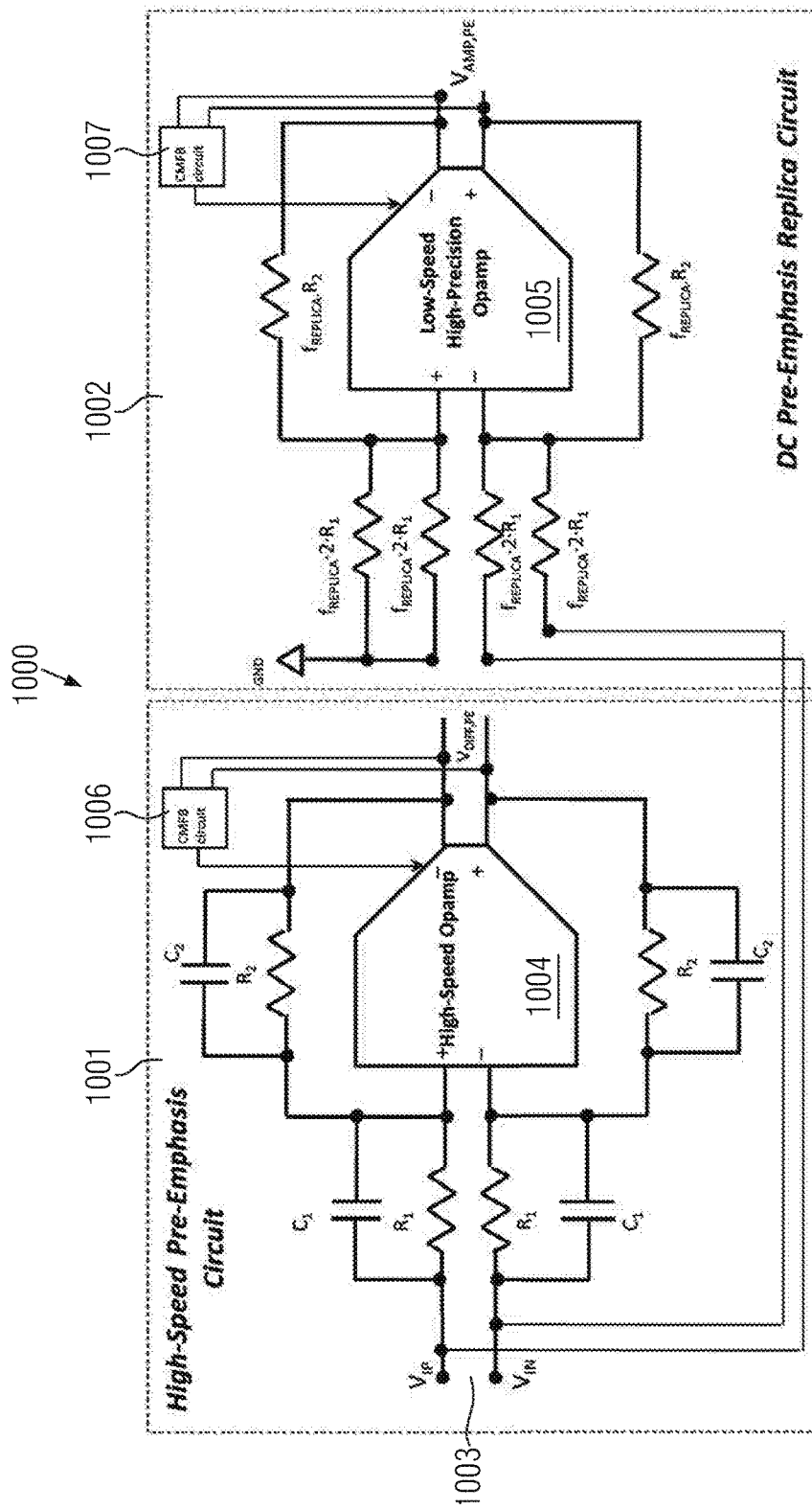
FIG. 10: Exemplary pre-emphasis block with negative feedback

FIG. 10 shows an exemplary architecture of a pre-emphasis block 1000 comprising a high-speed pre-emphasis block 1001 for applying a pre-emphasis with a high-speed gain over the input signal 1003 and a low-speed replica block 1002 applying a low-frequency gain to the signal of the control signal path, wherein the high-speed gain value matches or is proportional to the low-frequency gain value.

Thereby the signal of the control signal path may optionally have been generated by a low-frequency input signal amplitude estimator (not shown).

The input signal 1003 can be differential voltage input signal, wherein the input signal 1003 may have undergone a previous input signal conditioning, e.g. via a high speed differential input signal conditioner and/or a low-frequency input signal amplitude estimator (not shown).

The exemplary pre-emphasis block 1001 can, for example, be arranged separate from an input signal conditioner block (not shown), or the/a pre-emphasis block can be combined with an input signal conditioner block to reduce power consumption.

The pre-emphasis block is based on the use of operational amplifiers (opamps) with negative feedback in both the high-speed pre-emphasis block 1001 and the low-speed replica block 1002, i.e. with high-speed operational amplifier 1004 and common-mode-feedback (CMFB) circuit 1006 in the high-speed pre-emphasis block 1001 and with low-speed operational amplifier 1005 and common-mode-feedback (CMFB) circuit 1007 in the low-speed replica block 1002, wherein the common-mode-feedback (CMFB) circuits 1006, 1007 can be of the same type.

As previously describe, in the exemplary high-speed block 1001 a low-frequency gain can be defined by a resistor ratio $$G_{HS}^{PE} = \frac{R_2}{R_1}$$

and a high-frequency gain can be defined by a capacitor ratio $$G_{HS}^{PE} \cdot G_{PEAKING} = \frac{C_1}{C_2}$$

Consequently $$G_{PEAKING} = \frac{C_1 \cdot R_2}{C_2 \cdot R_1},$$

and the zero position of the previously described exemplary one-pole one-zero pre-emphasis function is $$f_{ZERO} = \frac{1}{2\pi R_1 \cdot C_1}$$

and the pole position is $$f_{POLE} = \frac{1}{2\pi R_2 \cdot C_2}.$$

In this example, the zero/pole positions and the high-frequency gain then are only dependent on passive devices ($C_1$, $C_2$ and $R_1$, $R_2$), which are generally well controlled and which undergo just small process variations.

In the low-speed pre-emphasis replica block 1002 the same gain can then be obtained via $$G_{DC}^{PE} = \frac{f_{REPLICA} \cdot R_2}{f_{REPLICA} \cdot R_1} = G_{HS}^{PE}$$

Figure 11:
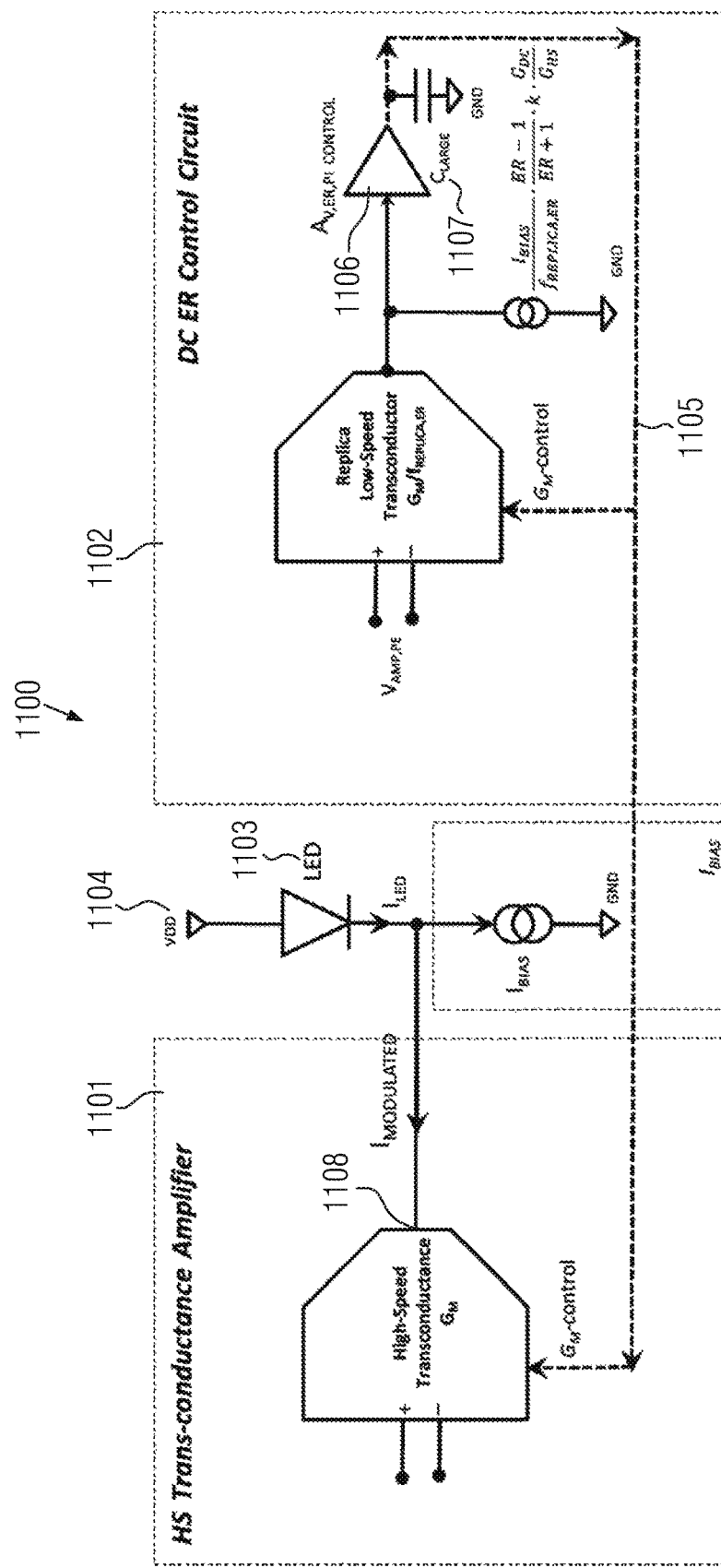
FIG. 11: Exemplary trans-conductance amplifier block

FIG. 11 shows an exemplary architecture of a possible trans-conductance amplifier block 1100 comprising a high-speed trans-conductance amplifier 1101 and a low-frequency control circuit 1102.

The high-speed trans-conductance amplifier 1101 can be single-ended, i.e. have a signal output 1108.

The exemplary architecture of a possible trans-conductance amplifier block is thereby inter alia suitable to drain current from a LED 1103 connected to power supply VDD 1104. The same principle can also be applied to provide currents towards a LED connected to ground (GND).

The variation of the trans-conductance value $G_M$ can be carried out means of signal $G_M$—control 1105, i.e. by the low-frequency extinction ration control circuit 1102 configured to control the trans-conductance of the high-speed trans-conductance amplifier 1101.

This control signal 1105 can, for example, change the input pair current polarization or change the degeneration resistance in a degenerated input pair. Other ways of controlling $G_M$ are also possible. For example, changing the common-mode input voltage of a common-source stage could also provide a way for controlling $G_M$.

The low-frequency control circuit 1102 can be a replica of the high-speed trans-conductance amplifier 1101 with a proportional trans-conductance $G_M/f_{REPLICA,ER}$ and can also be controlled in a feedback loop by the $G_M$—control signal 1105.

The low-frequency control circuit 1102 can comprise proportional-integral (PI) controller, for example by means of a high direct current (DC) gain $A_{V,ER,PI\ CONTROL}$ amplifier 1106 whose bandwidth can be defined the capacitor $C_{LARGE}$ 1107.

Furthermore, both $I_{BIAS}$ and $$\frac{I_{BIAS}}{f_{REPLICA,ER}} \cdot \frac{ER-1}{ER+1} \cdot \frac{G_{DC}}{G_{HS}} \cdot k$$

can be mirrored copies of a golden reference current that, for example, can be accurately generated by means of a known standard band gap and current conveyor circuitry.

Figure 12:
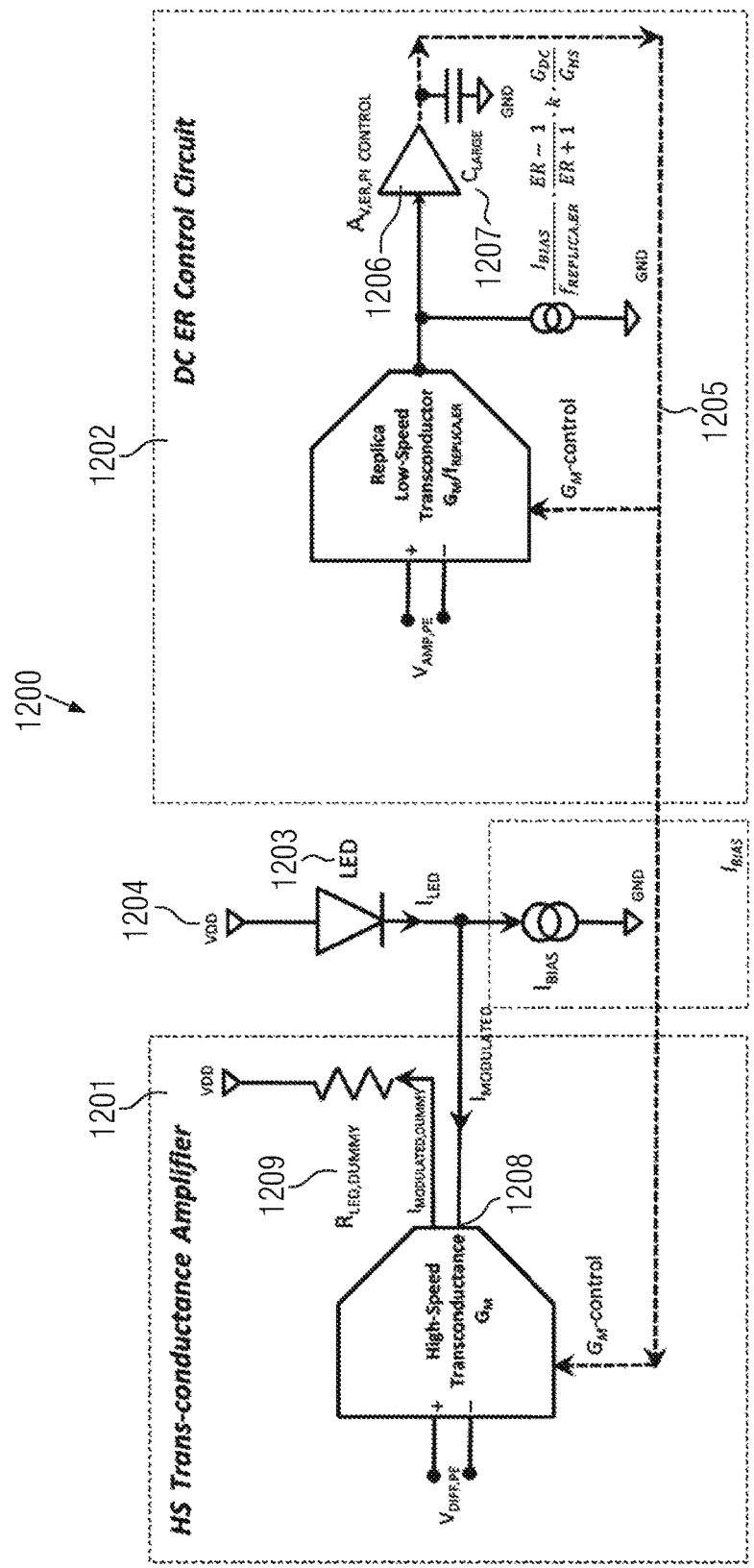
FIG. 12: Further example of a trans-conductance amplifier block

FIG. 12 shows a further exemplary architecture of a possible trans-conductance amplifier block 1200 comprising a high-speed trans-conductance amplifier 1201 and a low-frequency control circuit 1202.

The trans-conductance amplifier block 1200 can be in large parts analog or identical to trans-conductance amplifier block 1100, i.e. the components referred to by the reference numerals 1201 to 1207 can be analog or identical to the reference numerals 1101 to 1107 of trans-conductance amplifier block 1100 from FIG. 11.

However, as shown here, the high-speed trans-conductance amplifier 1201 can be implemented also in a fully differential version, i.e. can be double-ended, i.e. can have a differential output 1208.

Such a possible fully differential high-speed trans-conductance amplifier 1201 can thereby be configured such that a current of same value but opposite sense as the current flowing through the light emitting diode 1203 is also flowing through a dummy resistance 1209 that can replicate the equivalent low-frequency impedance of the LED.

This can inter alia improve the power supply rejection ratio (PSRR).

Figure 13:
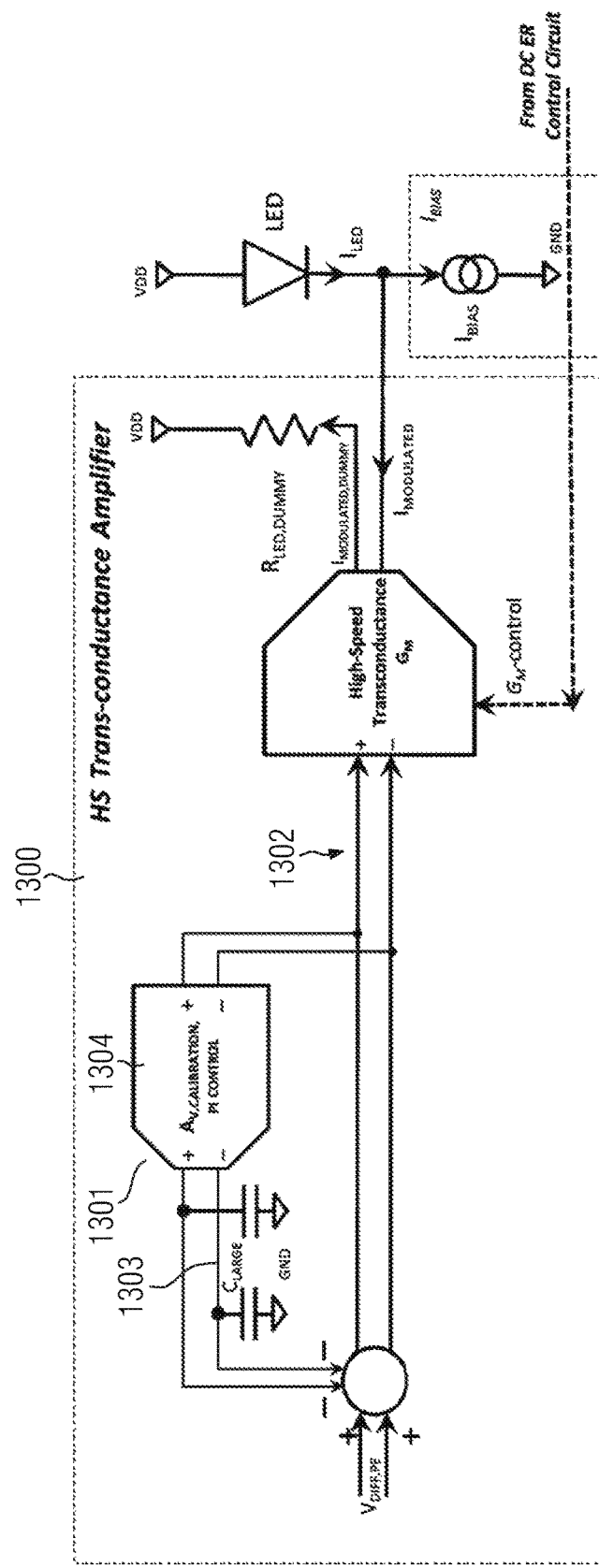
FIG. 13: Example of a high-speed trans-conductance amplifier including an exemplary calibration offset circuitry

FIG. 13 shows a further exemplary architecture of a possible high-speed trans-conductance amplifier 1300 controlled by a low-frequency control circuit (not shown).

As mentioned in the general description part above, it is further possible, that a calibration block (offset calibration block) 1301 for correcting possible offsets in the high-speed signal path, can be implemented at the high-speed trans-conductance amplifier input(s) 1302 as shown here or also at later stages inside the high-speed trans-conductance amplifier.

The calibration block 1301 for eliminating offsets in a high-speed differential input signal can comprise a proportional-integral (PI) controller implemented by means of a high direct current (DC) gain $A_{V,CALIBRATION,PI\ CONTROL}$ amplifier 1304 whose bandwidth can be defined by a capacitor $C_{LARGE}$ 1303.

To satisfy $f_{POLE,CALIBRATION} < f_{MIN,SIGNAL}$ the bandwidth of the $A_{V,CALIBRATION,PI\ CONTROL}$ amplifier 1304 can be limited. A sufficient low enough $f_{POLE,CALIBRATION}$ can, for example, be obtained by using one or more sufficiently large capacitors $C_{LARGE}$.

It is to be noted that the electronic components or blocks or circuits for a light emitting diode driving circuit described exemplary above, such as high-speed trans-conductance amplifiers, low-frequency control circuits, high-speed (differential) input signal conditioners, and low-frequency input signal amplitude estimators are all compatible with each other and can be arranged in a different order and/or in a different combination.

For example, an optional pre-emphasis block may be arranged before a trans-conductance amplifier block or before an input signal conditioner block.

Figure 14:
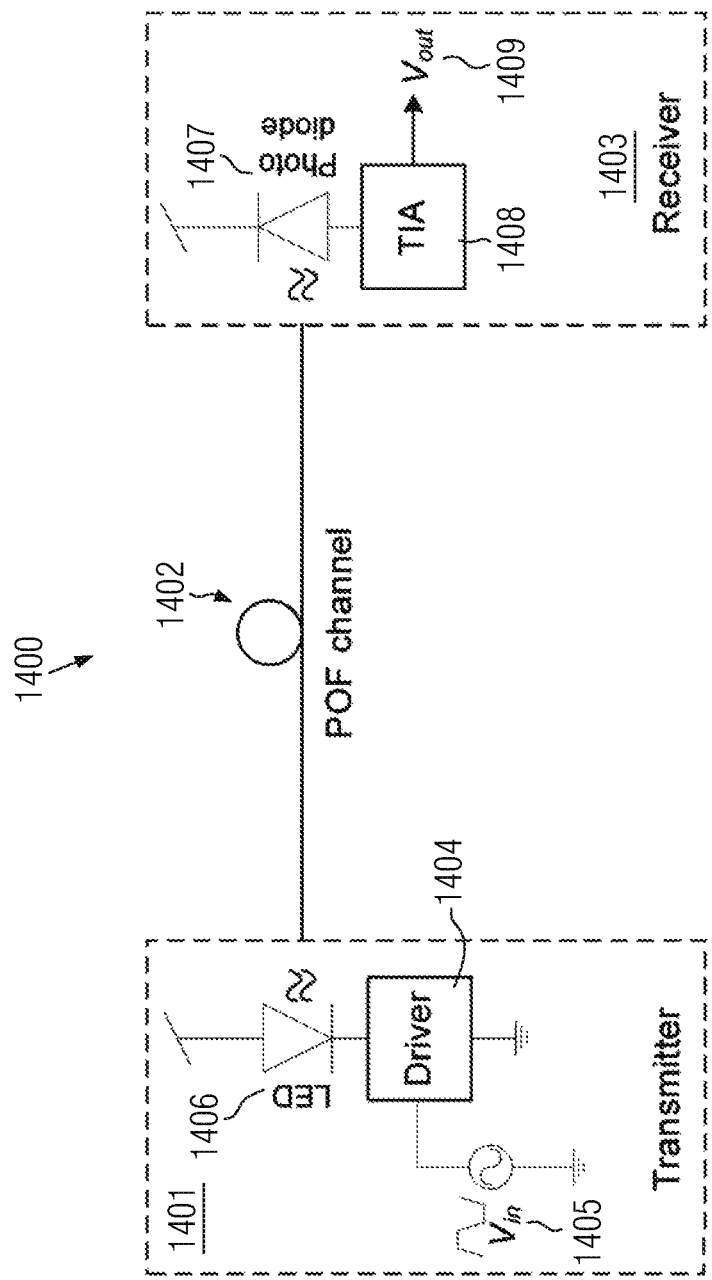
FIG. 14: Example of an optical communication system

FIG. 14 exemplary shows an optical communication system 1400 comprising an optical transmitter 1401, an optical fiber link 1402, e.g. a plastic fiber, and an optical receiver 1403.

In this exemplary optical communication system 1400 a light emitting device, e.g. light emitting diode (LED) 1406, of the optical transmitter, outputs an optical signal that is fed into an optical fiber link 1402, e.g. a plastic fiber, which guides the optical signal to a light receiving device, the optical receiver 1403, where the light is for example received by a photo diode 1407. The light received by the photo diode 1407 generates a photocurrent that is converted, for example, by a trans-impedance amplifier (TIA) 1408 into an electrical voltage output signal 1409.

Furthermore, in this exemplary optical communication system 1400 the transmitter 1401 receiving an exemplary input voltage signal 1405 comprises a light emitting diode driving circuit 1404 according to and consistent with the exemplary architecture(s) of a light emitting diode driving circuit described above, and which drives and controls the light emitting diode (LED) 1406.

For completeness it is noted that the exemplary architecture(s) of a light emitting diode driving circuit described above is/are not limited to a MOS (metal-oxide-semiconductor) architecture based implementation. The design of the architecture of a light emitting diode driving circuit exemplary described above is also compatible with any other technology, such as, for example, Bipolar (bipolar junction transistor technology), BiCMOS (combination of bipolar junction transistor technology and complementary metal-oxide-semiconductor technology), GaAs (Gallium Arsenide) based technology, etc.

Followed by 14 sheets comprising 14 figures.

The reference numerals identify the following components:

100 The reference numerals identify the following components:
101 Exemplary light emitting diode driving circuit
102 Exemplary high-speed signal path
103 Exemplary low-frequency control path/exemplary low-speed control path
104 Exemplary input signal conditioner, exemplary input signal conditioner block
105 Exemplary trans-conductance amplifier, exemplary trans-conductance amplifier block
106 Exemplary input signal, e.g. differential input signal, differential voltage input signal 107 Exemplary first voltage input
108 Exemplary second voltage input
109 Exemplary output signal, e.g. modulated current for driving a light emitting diode
110 Exemplary light emitting diode (LED)
111 Exemplary high-speed differential input signal conditioner
112 Exemplary low-frequency input signal amplitude estimator
113 Exemplary low-frequency control circuit
114 Exemplary high-speed trans-conductance amplifier
115 Exemplary trans-conductance, exemplary trans-conductance control signal
116 Exemplary trans-conductance of high-speed trans-conductance amplifier, exemplary trans-conductance control signal
117 Exemplary signal generated by low-frequency input signal amplitude estimator
118 Exemplary signal generated by high-speed differential input signal conditioner
119 Exemplary low-speed trans-conductance amplifier
120 Exemplary proportional-integral controller of low-frequency control circuit
121 Exemplary total current flowing through LED
122 Exemplary optical power output
123 Exemplary bias current
200 Exemplary pre-emphasis function
201 Exemplary frequency axis
202 Exemplary gain axis
203 Exemplary zero position of pre-emphasis function
204 Exemplary pole position of pre-emphasis function
205 Exemplary value of pre-emphasis function before the zero position
206 Exemplary value of pre-emphasis function after the pole position
300 Exemplary optical transmitter
301 Exemplary light emitting diode driving circuit
302 Exemplary high-speed signal path
303 Exemplary low-frequency control path/exemplary low-speed control path
304 Exemplary input signal conditioner, exemplary input signal conditioner block
305 Exemplary trans-conductance amplifier, exemplary trans-conductance amplifier block
306 Exemplary input signal, e.g. differential input signal, differential voltage input signal
307 Exemplary first voltage input
308 Exemplary second voltage input
309 Exemplary output signal, e.g. modulated current for driving a light emitting diode
310 Exemplary light emitting diode (LED)
311 Exemplary high-speed differential input signal conditioner
312 Exemplary low-frequency input signal amplitude estimator
313 Exemplary low-frequency control circuit
314 Exemplary high-speed trans-conductance amplifier
315 Exemplary trans-conductance, exemplary trans-conductance control signal
316 Exemplary trans-conductance of high-speed trans-conductance amplifier, exemplary trans-conductance control signal
317 Exemplary signal generated by low-frequency input signal amplitude estimator
318 Exemplary signal generated by high-speed differential input signal conditioner
319 Exemplary low-speed trans-conductance amplifier
320 Exemplary proportional-integral controller of low-frequency control circuit
321 Exemplary total current flowing through LED
322 Exemplary optical power output
323 Exemplary pre-emphasis block
324 Exemplary high-speed pre-emphasis block
325 Exemplary low-speed pre-emphasis replica block
326 Exemplary signal generated by low-speed pre-emphasis replica block
327 Exemplary signal generated by high-speed pre-emphasis block
400 Exemplary signal flow behaviour in an exemplary light emitting diode driving circuit
401 Exemplary time series of exemplary differential input signal
402a Exemplary time series of voltage signal in low-frequency input signal amplitude estimator
402b Exemplary time series of voltage signal in high-speed differential input signal conditioner
403a Exemplary time series of voltage signal in low-speed pre-emphasis replica block
403b Exemplary time series of voltage signal in high-speed pre-emphasis block
404a Exemplary time series of trans-conductance in low-speed/low-frequency control circuit
404b Exemplary time series of output signal of high-speed trans-conductance amplifier
405 Exemplary time series of current flowing through LED
406 Exemplary time series of optical power output of LED
407 Exemplary high-speed signal path
408 Exemplary low-frequency control path
500 Exemplary calibration function
600 Exemplary optical transmitter
601 Exemplary light emitting diode driving circuit
602 Exemplary high-speed signal path
603 Exemplary low-frequency control path/exemplary low-speed control path
604 Exemplary input signal conditioner, exemplary input signal conditioner block
605 Exemplary trans-conductance amplifier, exemplary trans-conductance amplifier block
606 Exemplary input signal, e.g. differential input signal, differential voltage input signal
607 Exemplary first voltage input
608 Exemplary second voltage input
609 Exemplary output signal, e.g. modulated current for driving a light emitting diode
610 Exemplary light emitting diode (LED)
611 Exemplary high-speed differential input signal conditioner
612 Exemplary low-frequency input signal amplitude estimator
613 Exemplary low-frequency control circuit
614 Exemplary high-speed trans-conductance amplifier
615 Exemplary trans-conductance, exemplary trans-conductance control signal
616 Exemplary trans-conductance of high-speed trans-conductance amplifier, exemplary trans-conductance control signal
617 Exemplary signal generated by low-frequency input signal amplitude estimator
618 Exemplary signal generated by high-speed differential input signal conditioner
619 Exemplary low-speed trans-conductance amplifier 620 Exemplary proportional-integral controller of low-frequency control circuit
621 Exemplary total current flowing through LED
622 Exemplary optical power output
623 Exemplary pre-emphasis block
624 Exemplary high-speed pre-emphasis block
625 Exemplary low-speed pre-emphasis replica block
626 Exemplary signal generated by low-speed pre-emphasis replica block
627 Exemplary signal generated by high-speed pre-emphasis block
628 Exemplary calibration block/offset calibration block
629 Exemplary proportional-integral (PI) controller
700 Exemplary digital-to-analog converter (DAC)
701 Exemplary input termination of light emitting diode driving circuit/LED driver input termination impedance
702 Exemplary differential voltage input signal ($V_{AMP,IN}$)
800 Exemplary input signal conditioner block
801 Exemplary input termination of light emitting diode driving circuit/LED driver input termination impedance
802 Exemplary differential voltage input signal ($V_{AMP,IN}$)
803 Exemplary high-speed input signal conditioner/high-speed differential input signal conditioner
804 Exemplary low-frequency input signal amplitude estimator/DC input signal amplitude estimator
900 Exemplary input signal conditioner block
901 Exemplary input termination of light emitting diode driving circuit/LED driver input termination impedance
902 Exemplary differential voltage input signal ($V_{AMP,IN}$)
903 Exemplary high-speed input signal conditioner/high-speed differential input signal conditioner
904 Exemplary low-frequency input signal amplitude estimator/DC input signal amplitude estimator
905 Exemplary high-speed operational amplifier
906 Exemplary low-speed operational amplifier
907 Exemplary common-mode feedback (CMFB) circuit in high-speed input signal conditioner
908 Exemplary common-mode feedback (CMFB) circuit in low-frequency input signal amplitude estimator
1000 Exemplary pre-emphasis block
1001 Exemplary high-speed pre-emphasis block/high-speed pre-emphasis circuit
1002 Exemplary low-speed pre-emphasis replica block/DC pre-emphasis replica circuit/low-speed pre-emphasis replica block
1003 Exemplary input signal
1004 Exemplary high-speed operational amplifier
1005 Exemplary low-speed operational amplifier
1006 Exemplary common-mode feedback (CMFB) circuit in high-speed pre-emphasis block
1007 Exemplary common-mode feedback (CMFB) circuit in low-speed pre-emphasis replica block
1100 Exemplary trans-conductance amplifier block
1101 Exemplary high-speed trans-conductance amplifier
1102 Exemplary low-frequency control circuit/direct current (DC) extinction ratio circuit
1103 Exemplary light emitting diode (LED)
1104 Exemplary power supply VDD
1105 Exemplary control signal/trans-conductance control signal/trans-conductance
1106 Exemplary high direct current (DC) gain amplifier
1107 Exemplary capacitor
1108 Exemplary single end/single output of high-speed trans-conductance amplifier
1200 Exemplary trans-conductance amplifier block
1201 Exemplary high-speed trans-conductance amplifier
1202 Exemplary low-frequency control circuit/direct current (DC) extinction ratio circuit
1203 Exemplary light emitting diode (LED)
1204 Exemplary power supply VDD
1205 Exemplary control signal/trans-conductance control signal/trans-conductance
1206 Exemplary high direct current (DC) gain amplifier
1207 Exemplary capacitors
1208 Exemplary fully differential output of high-speed trans-conductance amplifier
1209 Exemplary dummy resistance
1300 Exemplary high-speed trans-conductance amplifier
1301 Exemplary calibration block (offset calibration block)
1302 Exemplary high-speed trans-conductance amplifier input(s) 1302
1303 Exemplary capacitor
1304 Exemplary high direct current (DC) gain amplifier
1400 Exemplary optical communication system
1401 Exemplary optical transmitter
1402 Exemplary optical fiber link
1403 Exemplary optical receiver
1404 Exemplary light emitting diode driving circuit
1405 Exemplary input signal, e.g. voltage signal
1406 Exemplary light emitting diode
1407 Exemplary light receiving element, e.g. photo diode
1408 Exemplary trans-impedance amplifier (TIA)
1409 Exemplary output signal, e.g. voltage output signal, of optical communication system

The invention claimed is:

1. A light emitting diode driving circuit for use in an optical transmitter comprising:
a high-speed signal path comprising a high-speed trans-conductance amplifier configured for a linear transformation of an input voltage signal to an output current signal for linear modulation of a light emitting diode, and
a low-frequency control path configured for generating a trans-conductance in dependence of a low-frequency component of the input signal, and
wherein the low-frequency control path is configured for controlling the trans-conductance of the high-speed trans-conductance amplifier.

2. Light emitting diode driving circuit according to claim 1, wherein the input signal is a differential input signal, e.g. a differential voltage signal, and wherein the high-speed signal path further comprises a high-speed differential input signal conditioner for applying a gain to the differential input signal and/or adapt the input signal common-mode.

3. Light emitting diode driving circuit (101) according to claim 1, wherein the low-frequency control path comprises a low-frequency input signal amplitude estimator configured for generating a signal in dependence of the amplitude of the input signal and further
comprises a low-frequency control circuit configured for generating a trans-conductance in dependence of the signal generated by the low-frequency input signal amplitude estimator, and
wherein the low-frequency control circuit is configured for controlling the trans-conductance of the high-speed trans-conductance amplifier (114) based on the trans-conductance generated by the low-frequency control circuit (113) in dependence of the signal generated by the low-frequency input signal amplitude estimator.

4. Light emitting diode driving circuit according to claim 3, wherein the low-frequency control circuit comprises a low-speed trans-conductance amplifier and a proportional-integral controller.

5. Light emitting diode driving circuit according to claim 1, wherein the light emitting diode driving circuit is configured for keeping the light emitting diode extinction ratio and polarization constant, for example, by means of an invariant polarization current, e.g. $I_{BIAS}$.

6. Light emitting diode driving circuit according to claim 1, further comprising a pre-emphasis block, wherein the pre-emphasis block comprises a high-speed pre-emphasis block for applying a pre-emphasis with a high-speed gain over the input signal and a low-speed replica block applying a low-frequency gain to the signal generated by the low-frequency input signal amplitude estimator, wherein the high-speed gain value matches or is proportional to the low-frequency gain value.

7. Light emitting diode driving circuit according to claim 6, wherein the pre-emphasis block is combined with the input signal conditioner into a single block, wherein the high-speed differential input signal conditioner is merged with the high-speed pre-emphasis block, and wherein low-frequency input signal amplitude estimator is merged with the low-speed pre-emphasis replica block.

8. Light emitting diode driving circuit according to claim 1, further comprising a calibration block for correcting possible offsets in the high-speed signal path, wherein, for example, the calibration block is implemented in the high-speed trans-conductance amplifier.

9. Light emitting diode driving circuit according to claim 2, wherein the high-speed differential input signal conditioner comprises a unity buffer and two resistors and/or wherein the low-frequency input signal amplitude estimator comprises a unity buffer and two resistors.

10. Light emitting diode driving circuit according to claim 2, wherein the high-speed differential input signal conditioner comprises at least one operational amplifier with negative feedback and/or wherein the low-frequency input signal amplitude estimator comprises at least one operational amplifier with negative feedback.

11. Light emitting diode driving circuit according to claim 6, wherein the pre-emphasis block comprises at least one operational amplifier with negative feedback.

12. Light emitting diode driving circuit according to claim 1, comprising
    a single-ended high-speed trans-conductance amplifier, or
    a fully differential high-speed trans-conductance amplifier, which is configured such that a current of same value but opposite sense as the current flowing through the light emitting diode (1203) is also flowing through a dummy resistance, and
    a low-frequency control circuit comprising a single-ended low-speed trans-conductance amplifier and a proportional-integral controller.

13. Light emitting diode driving circuit according to claim 1, wherein the low-frequency input signal amplitude estimator comprises an envelope detector and/or a root-mean-squared value detector and/or a common mode voltage detector value.

14. An optical transmitter for use in an optical communication system comprising:
    at least one light emitting diode, and
    at least one light emitting diode driving circuit according to claim 1.

* * * * *